United States Patent
Piersol

(10) Patent No.: US 8,504,907 B2
(45) Date of Patent: Aug. 6, 2013

(54) GENERATING PAGE AND DOCUMENT LOGS FOR ELECTRONIC DOCUMENTS

(75) Inventor: Kurt W. Piersol, Campbell, CA (US)

(73) Assignee: Ricoh Co., Ltd., Tokyo (JP)

( * ) Notice: Subject to any disclaimer, the term of this patent is extended or adjusted under 35 U.S.C. 154(b) by 82 days.

(21) Appl. No.: 13/042,293

(22) Filed: Mar. 7, 2011

(65) Prior Publication Data

US 2012/0233535 A1 Sep. 13, 2012

(51) Int. Cl.
*G06F 17/00* (2006.01)

(52) U.S. Cl.
USPC ........................................ 715/229; 715/203

(58) Field of Classification Search
USPC .................. 715/229, 230, 231, 203, 209
See application file for complete search history.

(56) References Cited

U.S. PATENT DOCUMENTS

| | | | |
|---|---|---|---|
| 6,952,800 B1* | 10/2005 | Danner et al. ............... 715/234 |
| 8,099,429 B2* | 1/2012 | Deyo et al. ................... 707/776 |
| 8,209,607 B2* | 6/2012 | Gallo et al. .................. 715/704 |
| 8,370,373 B2* | 2/2013 | Yamamoto .................... 707/758 |
| 2006/0112219 A1* | 5/2006 | Chawla et al. ............... 711/114 |
| 2006/0150079 A1* | 7/2006 | Albornoz et al. ............ 715/512 |
| 2006/0248444 A1* | 11/2006 | Vellanki et al. .............. 715/513 |
| 2008/0270464 A1* | 10/2008 | Wang et al. ............... 707/103 R |
| 2009/0150169 A1* | 6/2009 | Kirkwood et al. ................ 705/1 |
| 2009/0157987 A1* | 6/2009 | Barley et al. ................. 711/154 |
| 2009/0254572 A1* | 10/2009 | Redlich et al. .................. 707/10 |
| 2009/0284779 A1 | 11/2009 | Isshiki |
| 2011/0057884 A1 | 3/2011 | Gormish et al. |
| 2011/0060910 A1 | 3/2011 | Gormish et al. |
| 2012/0078612 A1* | 3/2012 | Kandekar et al. ................. 704/9 |
| 2012/0173539 A1* | 7/2012 | Carol et al. ................... 707/741 |
| 2012/0192064 A1* | 7/2012 | Antebi et al. ................. 715/255 |
| 2012/0271796 A1* | 10/2012 | Arrouye et al. .............. 707/625 |

FOREIGN PATENT DOCUMENTS

| | | |
|---|---|---|
| CN | 101582967 | 11/2009 |
| JP | 2002-342238 | 11/2002 |
| JP | 2004-206658 | 7/2004 |
| JP | 2008-234202 | 10/2008 |
| JP | 2009-75879 | 4/2009 |
| JP | 2009-277039 | 11/2009 |
| JP | 2009-278467 | 11/2009 |
| JP | 2011-0057884 | 3/2011 |

OTHER PUBLICATIONS

PCT International Search Report and Written Opinion for PCT Application No. PCT/JP2012/055494; dated Jun. 5, 2012; 8 pages.

* cited by examiner

*Primary Examiner* — Laurie Ries
(74) *Attorney, Agent, or Firm* — Patent Law Works LLP

(57) ABSTRACT

A method and system for generating page and document logs for electronic documents. The system includes a plurality of portable electronic devices and a workflow server. The portable electronic devices display a document that receives stroke input and images. A stroke capture device and module generates a log of segments and updates the log in response to a user erasing stroke data. An image capture module captures an image and inserts the image into a document. A logging module generates page metadata for each page within the document and document metadata that includes changes made to the page data. The logging module copies the page metadata and document metadata in response to a request. The copying includes a copy of all the metadata, metadata for selected pages and metadata for redacted content.

20 Claims, 16 Drawing Sheets

GENERATING PAGE AND DOCUMENT LOGS FOR ELECTRONIC DOCUMENTS

BACKGROUND OF THE INVENTION

1. Field of the Invention

The present embodiment of invention relates to generating page and document logs for electronic documents. In particular the present invention relates to generating logs of different types of data for pages and documents and copying selected portions of the page log in response to a request for a copy of the data.

2. Description of the Background Art

The use of portable computing devices has become commonplace for many users. In addition to having a conventional desktop computer, many users also have some type of portable computing device. Examples of present-day portable computing devices include electronic devices for reading such as the Reader from Sony Corp., the Kindle from Amazon, and the Nook from Barnes & Noble. Smaller portable computing devices include a plethora of smart phones including the iPhone from Apple Computer Inc., the Blackberry from Research In Motion and the Pre from Palm just to name a few. There have also been increased sales of notebook laptops and tablet computers offering different levels of processing capability and size.

Users download documents to their portable computing devices and make changes to the documents. These changes are recorded in a single log that describes every change made to the document including text edits, addition of stroke input data, etc. This method is problematic, however, because the document includes multiple pages and sometimes a user only wants to receive selected pages within the documents. Because the log includes all information for all pages of the document, the log will have extraneous and disorganized information.

In addition, when a document is being transmitted to multiple parties, authenticity of the document becomes critical. Previous attempts to solve this problem have included encrypting the document and providing the intended recipients with a key for decrypting the document itself. When a document is received by multiple parties, however, it becomes important to identify at what point in a document's lifecycle a problem was introduced into the document. Thus, what would be more helpful is a way to track the changes made to each page within the document and to verify the authenticity of each change made to each page.

SUMMARY OF THE INVENTION

The present embodiment of invention overcomes the deficiencies and limitations of the prior art by providing a method and system for generating page and document logs for electronic documents that are displayed on portable computing devices. In particular, the present embodiment of the invention provides a portable computing device that records changes to documents and generates a page log for each page in the document and a document log that tracks changes to the page logs and includes metadata that applies to the entire document. The logging module generates a compound document that includes both the page logs and the document log.

In response to a request for a copy of a document, the logging module generates a compound document that includes the page log and the document log. In response to a request for a copy of selected pages from the document, the logging module copies the page logs for the selected pages, updates a document log with the selected pages and updates a compound document with the page logs for the selected pages and the updated document log. In response to a request for a copy of redacted pages from the document, the logging module generates page logs with redacted content, updates a document log with the page logs with redacted content and updates a compound document with the updated document log and the pages logs with redacted content.

The portable computing device is adapted to receive images, determine from metadata whether a document includes an image region for the image and insert the image in the image region if present or at the end of the document if there is no image region. The portable computing device is also adapted to receive stroke data and includes a stroke and capture device and module for dividing the strokes into segments and generating a log of each segment and the time that it was created. When a portion of the stroke is erased using a stylus or a finger, the stroke capture device and module removes the erased segment from the log and transmits the updated information to the logging module.

The present embodiment of the invention also includes a novel method for copying the document, selected pages in the document, redacted pages in the documents and the corresponding compound document for the documents.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
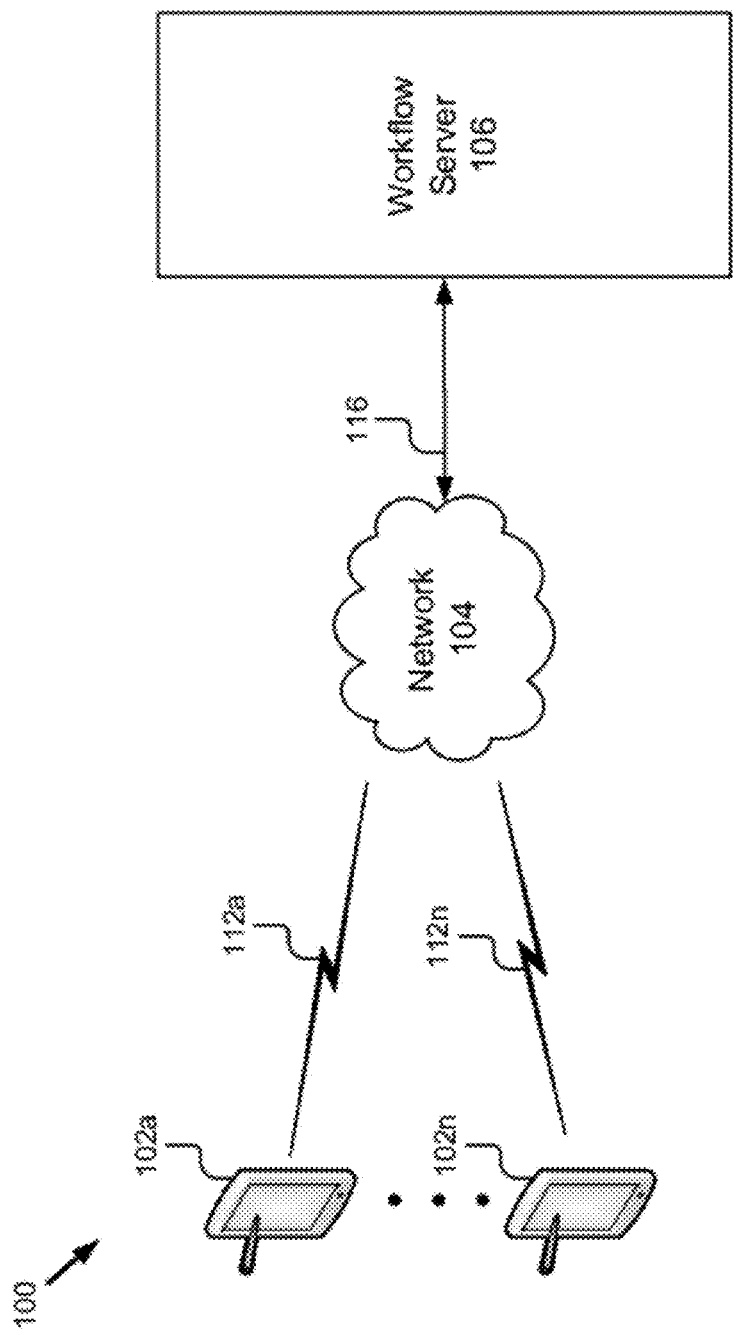
FIG. 1 is a block diagram of an embodiment of a system for routing documents in accordance with the present embodiment of invention.

A system for generating page and document logs for electronic documents that are displayed on a portable computing device is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram document in order to avoid obscuring the invention. For example, the present embodiment of invention is described in one embodiment below with reference to portable computing devices that are exemplified in a hardware and software platform like the Amazon Kindle that utilize electronic paper, e-paper or electronic ink display. However, the present embodiment of invention applies to any type of portable computing device that can capture ink, data and commands, and send documents electronically.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present embodiment of invention is described below in the content of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the document of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the document of an entirely hardware embodiment, an entirely software embodiment or an embodiment including both hardware and software elements. In a preferred embodiment, the invention is implemented in software, which includes but is not limited to firmware, resident software, microcode, etc.

Furthermore, the invention can take the document of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present embodiment of invention is described with reference to a particular programming language. It will be appreciated that a variety of programming languages may be used to implement the teachings of the invention as described herein.

System Overview

FIG. 1 shows an embodiment of a system 100 for transmitting documents between portable computing devices and a server. Referring now to FIG. 1, this embodiment of system 100 comprises: a plurality of portable computing devices 102a-102n, a network 104, and a workflow server 106.

The plurality of portable computing devices 102a-102n is wirelessly coupled to the network 104 via respective couplings 112a-112n. The portable computing device 102 is coupled to the workflow server 106 via the network 104. The portable computing devices 102a-102n include a display, stroke capture capability, audio capture capability, gesture recognition capability and a wireless communication capability. The portable computing devices 102a-102n are adapted to receive images (e.g., documents or forms), add stroke annotations to the received images, and send the annotated received images. Embodiments of the portable computing devices 102a-102n will be described in more detail below with reference to FIG. 2A.

The network 104 is a conventional type, wired or wireless, and may have any number of configurations such as a star configuration, token ring configuration or other configurations known to those skilled in the art. Furthermore, the network 104 may comprise a local area network (LAN), a wide area network (WAN) (e.g., the Internet), and/or any other interconnected data path across which multiple devices may communicate. In yet another embodiment, the network 104 may be a peer-to-peer network. The network 104 may also be coupled to or includes portions of a telecommunications network for sending data in a variety of different communication protocols. In yet another embodiment, the network 104 includes Bluetooth communication networks or a cellular communications network for sending and receiving data such as via short messaging service (SMS), multimedia messaging service (MMS), hypertext transfer protocol (HTTP), direct data connection, WAP, email, etc.

The workflow server 106 is coupled to the network 104 via signal line 116 for communication with the portable computing devices 102a-102n. The workflow server 106 includes modules for receiving data, logging changes in documents, selling applications and documents, registering devices, applications and forms, etc. The modules are described in greater detail in FIG. 2B.

In one embodiment, applications are made available on the workflow server 106 and transmitted to the plurality of portable computing devices 102a-102n via the network 104. The application generates a document that is displayed on the portable computing devices 102a-102n. A user inputs data onto the document, for example, by writing on the portable computing device 102a using a stylus. In one embodiment, the application includes a module for translating the stroke information into text. In another embodiment, the stroke data is transmitted to the workflow server 106 for further processing.

Although the system of FIG. 1 shows only one workflow server 106, it should be understood that there could be any number of additional workflow servers, for example dedicated to other functions, companies, institutions, organizational structures. A computing device 102a-102n may communicate with more than one workflow server 106. Particular pages or sections of a document could be associated with different workflow servers. Also, portions of a compound document can be forwarded rather than sending the entire compound document.

Portable Computing Device 102

Figure 2A:
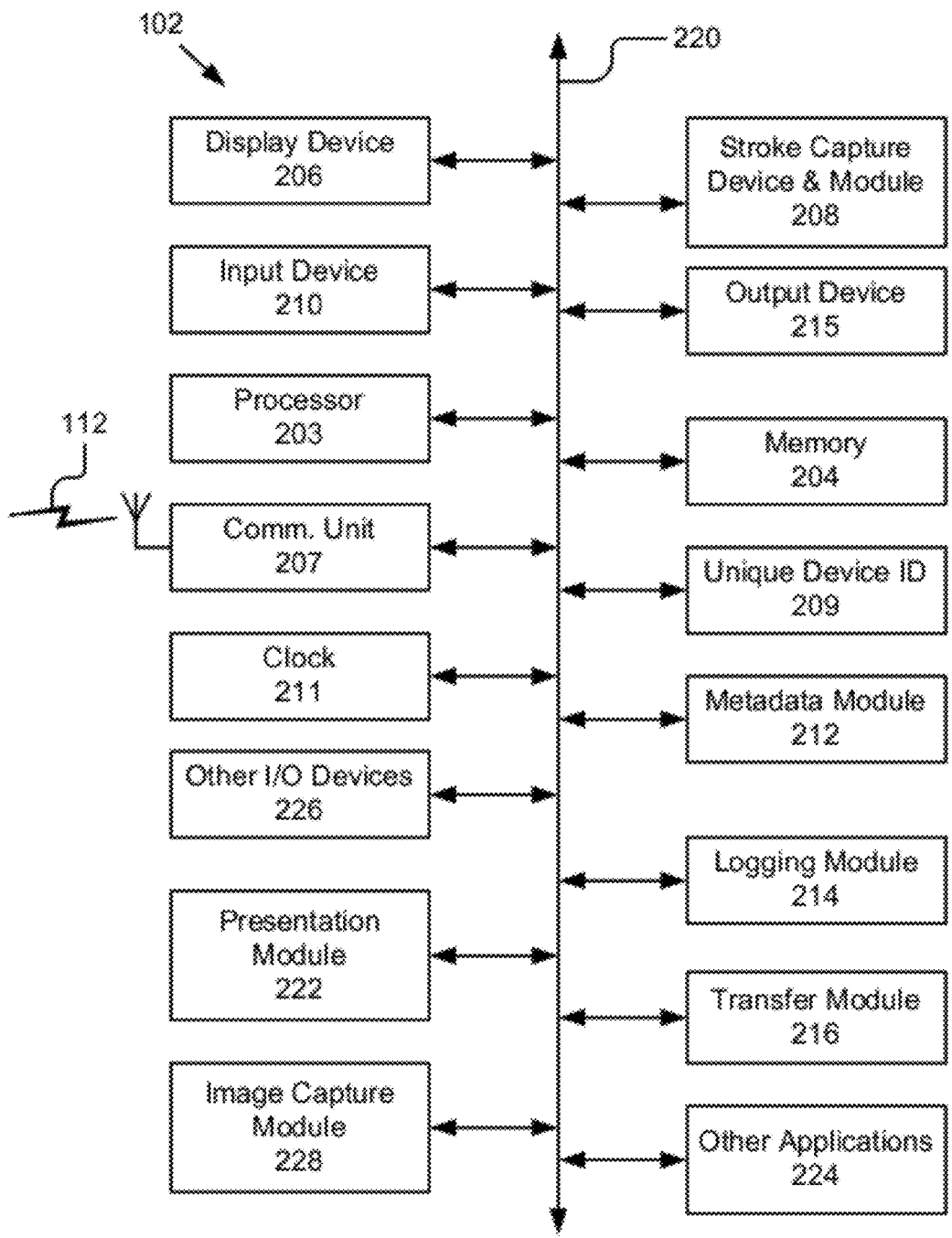
FIG. 2A is a block diagram of an embodiment of a portable computing device in accordance with the present embodiment of invention.

Referring now to FIG. 2A, the components of a portable computing device 102 are described. The portable computing device 102 comprises a display device 206, a stroke capture device and module 208, an input device 210, an output device 215, a processor 203, a memory 204, a communication unit 207, a unique device ID 209, a clock 211, a metadata module 212, other input/output (I/O) devices 226, a logging module 214, a presentation module 222, a transfer module 216, an image capture module 228 and other applications 224.

The processor 203 comprises an arithmetic logic unit, a microprocessor, a general purpose controller or some other processor array to perform computations, provide electronic display signals to display device 206, and detect and process stroke inputs. The processor 203 is coupled to the bus 220 for communication with the other components of the computing device 102. Processor 203 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2A, multiple processors may be included. The processing capability of the computing device 102 may be limited to supporting the display of images and the recording strokes and the transmission of strokes. The processing capability might be enough to perform more complex tasks, including various types of image processing, stroke processing, or recognition tasks. It will be obvious to one skilled in the art that other processors, operating systems, sensors, displays and physical configurations are possible. The computing device 102 also includes an operating system executable by the processor such as but not limited to WINDOWS®, MacOS X, Android, or UNIX® based operating systems.

The memory 204 stores instructions and/or data that may be executed by processor 203. The instructions and/or data may comprise code for performing any and/or all of the techniques described herein. The memory 204 may be a dynamic random access memory (DRAM) device, a static random access memory (SRAM) device, flash memory or some other memory device known in the art. In one embodiment, the memory 204 also includes a non-volatile memory such as a hard disk drive or flash drive for storing log information on a more permanent basis. The memory 204 is coupled by the bus 220 for communication with the other components of the computing device 102.

The communication unit 207 is coupled to an antenna and the bus 220. An alternate embodiment, the communication unit 207 may provide a port for direct physical connection to the network 104. The communication unit 207 includes a transceiver for sending and receiving compound documents. In one embodiment, the communication unit 207 includes a Wi-Fi transceiver for wireless communication with an access point. In another embodiment, the communication unit 207 includes a Bluetooth® transceiver for wireless communication with other devices. In yet another embodiment, the communication unit 207 includes a cellular communications transceiver for sending and receiving data over a cellular communications network such as via short messaging service (SMS), multimedia messaging service (MMS), hypertext transfer protocol (HTTP), direct data connection, WAP, email, etc. In still another embodiment, the communication unit 207 includes ports for wired connectivity such as but not limited to USB, SD, or CAT-5, etc. The communication unit 207 links the processor 203 to the network 104 that may include multiple processing systems. The network of processing systems may comprise a local area network (LAN), a wide area network (WAN) (e.g., the Internet), and/or any other interconnected data path across which multiple devices may communicate. The communication unit 207 also provides other conventional connections to the network 104 for distribution of files (media objects) using standard network protocols such as TCP/IP, HTTP, SSH, git HTTPS and SMTP as will be understood to those skilled in the art.

The computing device 102 includes storage for a unique device identifier 209. The computing device 102 is coupled to the bus 220 to provide the unique identifier to other components as needed. In one embodiment, the storage is read only memory for storing the unique device identifier 209. In another embodiment, the unique device identifier 209 is a nonvolatile storage storing a public key-private key pair. In another embodiment, the public key-private key pair is stored within a specialized trusted computing memory integrated with the CPU or main board of the device. It is useful for the computing device 102 to have a unique identifier that is used to verify the authenticity of the user to ensure that changes made to an application were performed by an authorized entity.

In one embodiment, the unique identifier is the hardware MAC address of a network chip in the computing device 102. The unique identifier 209 may be an internal part of another functional block, such as the communication unit 207, or in nonvolatile storage in memory unit 204. In another embodiment, the unique identifier is a unique ID associated with a memory card on the computing device 102, in that way association with a particular device would move to a different device when the memory card is moved, which might be an expected behavior. Unique identifiers are useful for a variety of operations, but typically do not provide much security. Hardware MAC addresses for example can be imitated by other devices. Thus it is sometimes valuable to have a device associated with a pair of keys from a public key cryptography system, such as RSA®. In one embodiment, the computing device 102 is manufactured with or configured with a private key and the public key disseminated. Then the computing device 102 can use its private key for digital signatures of strokes, images, logs, or other media originating on the device. Others may use the public key to verify such media. The public key may also be used to provide secret communication with the device. Use of the device public key for encryption will limit the access of others to page images or metadata intended solely for a particular computing device 102.

The clock 211 is a conventional type and provides an indication of local time for the computing device 102. In particular, the clock 211 is used to provide a local time at which compound documents are processed. This time value is also stored with data in the local log files using the logging module 214. The clock 211 is adapted to communicate this information to the processor 203 and the logging module 214 using the system bus 220.

The metadata module 212 is software including routines for extracting metadata from a document or image and storing metadata as part of a document. In one embodiment, the metadata module 212 is instructions executable by the processor 203 to provide the functionality described below with reference to FIGS. 7-9C for generating and extracting metadata. In one embodiment, the metadata module 212 is stored in the memory 204 and is accessible and executable by the processor 203. In any event, the metadata module 212 is adapted for cooperation and communication with the processor 203, the image capture module 228, the logging module 214 and other components of the computing device 102.

The image capture module 228 is software including routines for receiving an image from an input device 210, such as a camera or from the communication unit 207, which transmits an electronic document from a different source, such as a database or from another source. The image capture module 228 receives metadata from the metadata module 212 about a document and an image and inserts the image within the document based on the metadata. In one embodiment, the image capture module 228 is a set of routines executable by the processor 203 to receive an image, determine whether the document includes an image well for inserting the image based on the metadata and inserts the image in an image well if present or at the end of the document if there is no image well present. The image capture module 228 is coupled by the bus 220 to the processor 203, the memory 204, the input device 210, the transfer module 216 and the metadata module 212.

The logging module 214 is software including routines for creating and storing local logs in the memory 204, and more particularly, in a nonvolatile storage portion of the memory 204. In one embodiment, the logging module 214 is a set of routines executable by the processor 203 to store metadata in an entangled log at the computing device 102. The logging module 214 is particularly critical to provide verification of workflow completion in transactions. In one embodiment, the logging module 214 also includes routines for publishing or storing in a publicly available location on the network the logs of its particular computing device 102. The logging module 214 is coupled by the bus 220 to the processor 203, the memory 204, the image capture module 228 and the communication unit 207. FIG. 3B below illustrates an example of the type of information that is stored in a log, FIG. 4B illustrates a compound document that includes all the metadata and FIG. 4C illustrates an example of a document directory.

The logging module 214 generates a cryptographic hash associated with each log entry hash data including the cryptographic hash of the previous log entry. The series of hashes that each include the last hash is called a chained hash. Storing or publishing the cryptographic hash provides a checksum for all previous entries in the log. Thus if the published hash is "trusted" then it is possible to re-compute all previous log hashes and see if the same final hash results. Changes to any part of the log or any of the data that was hashed to make a log entry can be detected. The format and details for hash computation and verification of such logs and log entries are described in U.S. Pat. No. 7,849,053 filed on Dec. 29, 2005, titled "Coordination and Tracking of Workflows;" U.S. patent Ser. No. 12/244,714, filed on Oct. 2, 2008, titled "Method Apparatus for Tamper Proof Camera Logs;" and U.S. patent application Ser. No. 10/887,998, filed on Jul. 9, 2004 and titled "Synchronizing Distributed Work Through Document Logs," which are each herein incorporated by reference in their entirety.

The cryptographic hashes are also called content based identifiers (CBIs) because they can be used to index data in addition to use for verification. The publication of the most recent cryptographic hash can be to other trusted logs or via email as described in U.S. patent application Ser. No. 12/224,707, filed on Oct. 2, 2008, titled "Method and Apparatus For Risk Analysis of Entangled Logs" and U.S. patent application Ser. No. 12/244,721, filed on Oct. 2, 2008, titled "Method & Apparatus for Automatically Publishing Content Based Identifiers" which are each herein incorporated by reference in their entirety. Thus logs including cryptographic hashes or CBIs are maintained. The CBI of the recent log entries are stored in other log files and published via email or other protocols. These CBIs can later be used to verify that the log was not modified since the time the CBI was published.

The transfer module 216 is software and routines for transmitting and receiving applications and documents to and from the workflow server 106. In one embodiment, the transfer module 216 transmits applications to the workflow server 106 for display in the online marketplace. In other embodiments, the transfer module 216 sends and receives documents as formatted messages from any other computing device such as the workflow server 106. The transfer module 216 is coupled by the bus 220 for communication with the processor 203 and the communication unit 207. The transfer module 216 is responsible for transmitting and receiving the application, document or formatted message from the portable computing device 102 such as by email, file transfer, XMPP or special purpose application.

Aligned with the display device 206, there is a stroke capture device and module 208 such as a digitizing tablet or graphics pad. The stroke capture device 208 is a contact sensing device or a sonic, electromagnetic or light sensing device with receivers that could be above, below, or around the display. The stroke capture device 208 is capable of accepting strokes from a stylus, a finger or another implement. The stroke capture device 208 is a sensor for the stylus and has resolution sufficient to capture recognizable handwriting and printing and other drawings. In one embodiment, display device 206 is equipped with a touch screen in which a touch sensitive, transparent panel covers the screen of display device 206. The stroke capture device 208 and the display device 206 are coupled by the bus 220 to the memory 204, the processor 203, the presentation module 222 and the communication unit 207.

In one embodiment, the stroke capture device 208 is a digitizer manufactured and sold by Wacom Co., Ltd. In another embodiment, the stroke capture device 208 is simple sensors that return horizontal and vertical position of a single point of contact. In yet another embodiment, the stroke capture device 208 is a plurality of more complex sensors that return an indication of pressure, location, time, and even a stylus ID number or type or indication if a button is pressed on a stylus or the stylus has been inverted, e.g. to erase. Some sensors might return multiple points of contact. Some sensors might be able to distinguish between stylus and finger based touch input. The stroke capture device 208 is either part of or adapted to communicate with the stroke capture module 208. The stroke capture module 208 is software and routines for receiving stroke data, dividing the strokes into segments, and applying character recognition to the segments.

The bus 220 represents a shared bus for communicating information and data throughout the computing device 102. The bus 220 may represent one or more buses including an industry standard architecture (ISA) bus, a peripheral component interconnect (PCI) bus, a universal serial bus (USB), or some other bus known in the art to provide similar functionality. Additional components coupled to processor 203 through system bus 220 include the display device 206, the stroke capture device and module 208, the input device 210, the output device 215, the processor 203, the memory 204, the communication unit 207, the unique device identifier 209, the clock 211, the metadata module 212, the logging module 214, the transfer module 216, the image capture module 228, the presentation module 222 and the other applications 224. There may also be a plurality of busses in computing system 102, designed to provide the most efficient communications between functional elements.

The presentation module 222 is software and routines for displaying documents on the display device 206, and adjusting the display of the image responsive to input from input device 210. The presentation module 222 performs routines that cause the dual mode user interface to be displayed. In one embodiment, the presentation module 222 is a thin client routine executable by the processor 203 to cause display of the image on the display device 206. The presentation module 222 is coupled by the bus 220 to the display device 206, the processor 203, and the memory 204.

The other applications 224 include other software and routines executable by the processor 203 for various other types of functionality. In one embodiment, one or more application programs are executed by the processor 203 including, without limitation, word processing applications, electronic mail applications, financial applications, and web browser applications.

Finally, the computing device 102 may include one or more other I/O devices 226. For example, the other I/O devices 226 may include speakers to produce sound, microphones to record sound, a scanner or camera to record documents, images or video, and other sensors or feedback devices like accelerometers, pager motors, or haptic feedback. Optionally, the other I/O devices 226 may include one or more analog-to-digital or digital-to-analog converters, and/or one or more digital signal processors to facilitate audio processing. These other I/O devices 226 are coupled by bus 220 for communication with the processor 203 and the memory 204. Optionally, a microcontroller may be added as part of other I/O Devices 226 to facilitate power systems control, as well as off-load the main processor 203 from lower-speed lesser-important tasks.

Workflow Server 106

Figure 2B:
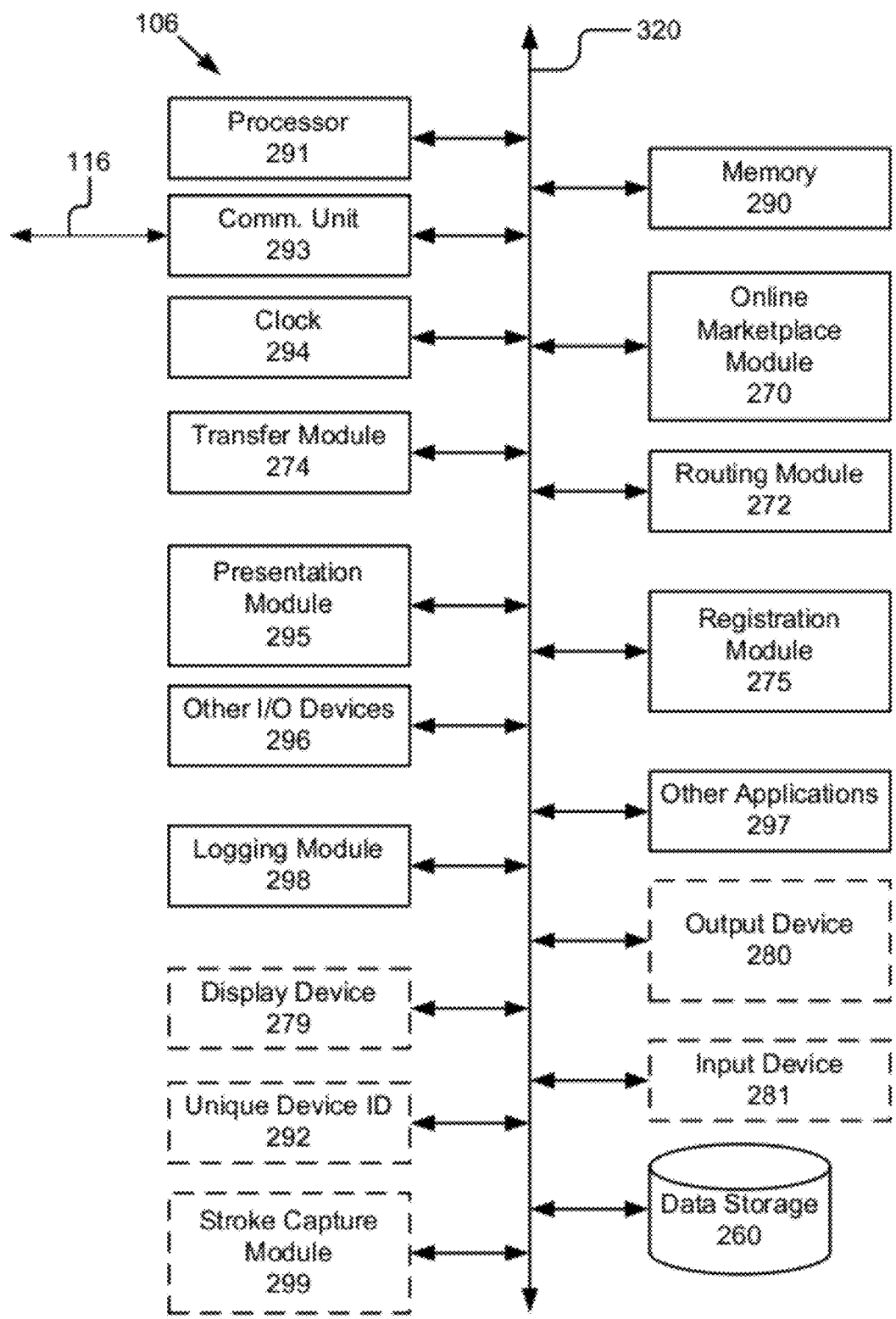
FIG. 2B is a block diagram of a workflow server in accordance with the present embodiment of invention.

Referring now to FIG. 2B, an embodiment of the workflow server 106 will be described in more detail. The workflow server 106 comprises a processor 291, a memory 290, a communication unit 293, an online marketplace module 270, a clock 294, a transfer module 274, a routing module 272, a presentation module 295, a registration module 275, other input/output devices 296, other applications 297, a logging module 298 and data storage 260. In an alternate embodiment, the workflow server 106 further comprises a display device 279, an output device 280, a unique device ID 292, an input device 281 and a stroke capture module 299.

Those skilled in the art will recognize that some of the components of the workflow server 106 have the same or similar functionality to the components of the computing device 102 so descriptions of these components will not be repeated here. For example, the processor 291, the memory 290, the communication unit 293, the logging module 298, the clock 294, the transfer module 274, the presentation module 295, the other input/output devices 296, the other applications 297, the display device 279, the output device 280, the unique device ID 292, the input device 281 have a similar functionality to the processor 203, the memory 204, the communication unit 207, the logging module 214, the clock 211, the transfer module 216, the presentation module 222, the other input/output devices 226, the other applications 224, the display device 206, the output device 215, the unique device ID 209 and the input device 210 of FIG. 2A, respectively.

Some differences between the components of the workflow server 106 and the computing device 102 are noted below. For example, the communication unit 293 may couple the workflow server 106 to the network 104 in a wired manner instead of wirelessly. The processor 291 is more computationally powerful than the processor 203 as the workflow server 106 likely services numerous portable computing devices 102. The transfer module 274 is an email server as opposed to an e-mail client. The display device 279 may be a cathode-ray tube, and the output device 280 is a set of speakers. The input device 281 includes a keyboard and mouse type controller. Those skilled in the art will recognize that there may be a variety of other differences as the components of the workflow server 106 acts as a hardware server as opposed to a remote client.

The logging module 298 generates a document log from the logs that are transmitted from the different portable computing devices 102. The document log is a central log of all activities that occurred with the document at the different portable computing devices 102. The document log includes the hashes from the page logs but not the details regarding what specifically occurred during each transaction. The specific actions can be recreated by retrieving the metadata associated with the document. The document log is described in greater detail with reference to FIG. 3D.

The registration module 275 is software and routines for generating identifiers and formalizing applications for being uploaded to the online marketplace module 270. In one embodiment, the registration module 275 is a routine executable by the processor 294 to generate identifiers and secret keys. The application is registered and transmitted to the online marketplace module 270 for uploading. The registration module 275 is coupled by the bus 320 to the processor 291, the memory 290 and the online marketplace module 270.

The routing module 272 is software and routines for extracting metadata received with an application or document, retrieving the secret from data storage 260, generating a signature, comparing the signature to the application document metadata, generating an error if the comparison yields conflicting data and routing the application to its destination if the signature matches the application or document metadata. In one embodiment, the routing module 272 is a routine executable by the processor 291 to cause comparison of the destination to the destination specified in the metadata and routing of the application or document to the destination if the comparisons are acceptable. If either of the comparison steps results in conflicting data, an error message is transmitted. The routing module 272 is coupled by the bus 320 to the processor 291 and the memory 290.

The online marketplace module 270 is software and routines for uploading applications to an online store, presenting applications for purchase, billing users that purchase applications and distributing credits to the developers. In one embodiment, the online marketplace module 270 is a routine executable by the processor 291 to bill a user for the initial purchase of an application and a subsequent fee for additional services as a monthly flat fee or per service. The online marketplace module 270 is coupled to the processor 291, the memory 290, the registration module 275 and the routing module 272.

In one embodiment, the data storage 260 is part of the workflow server 106. In an alternate embodiment, data storage 260 is coupled to the workflow server 106. For example, in such an alternate embodiment, the data storage 260 is an online storage service such as Amazon S3. The data storage 260 is a non-volatile memory device or similar permanent storage device and media. Data storage device 260 stores data and instructions for processor 291 and comprises one or more devices including a hard disk drive, a floppy disk drive, a CD-ROM device, a DVD-ROM device, a DVD-RAM device, a DVD-RW device, a flash memory device, or some other mass storage device known in the art. The data storage 260 is used to store the applications and associated metadata including hashes, identifiers, secret keys, signatures, etc.

Format of the Document, Pages and Metadata

Figure 3A:
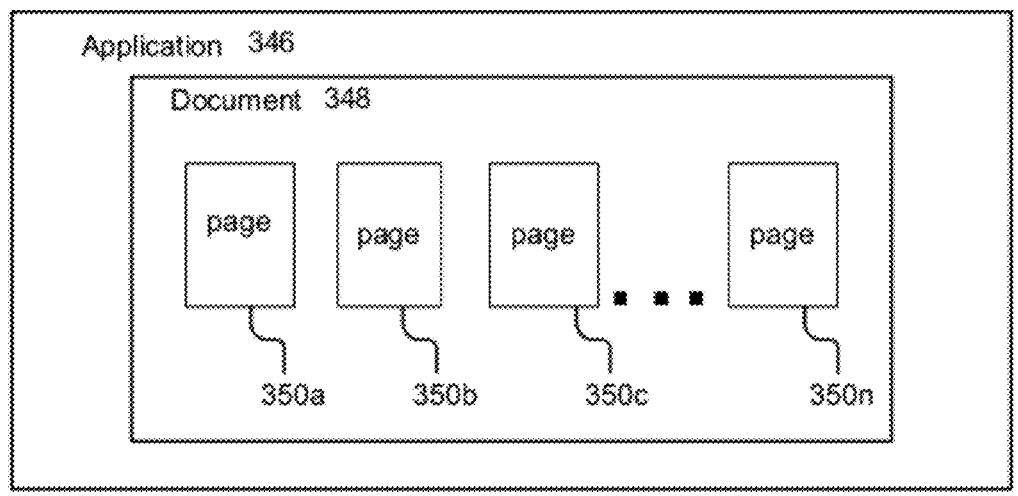
FIG. 3A is a block diagram of an application including a document with pages in accordance with the present embodiment of invention.
Figure 3B:
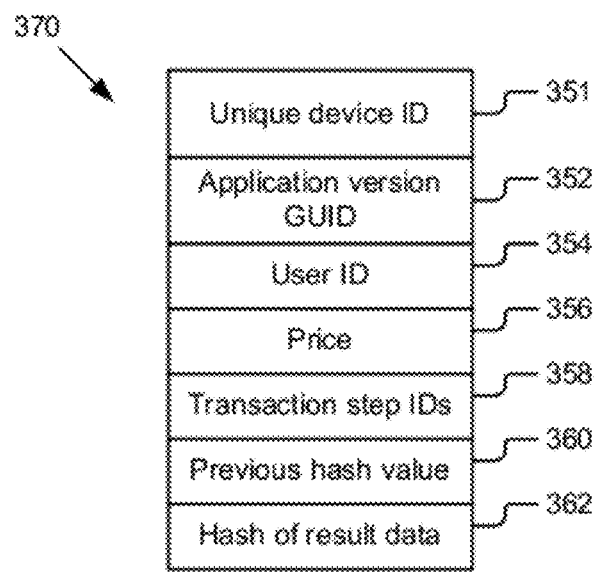
FIG. 3B is a graphical representation of a log entry in accordance with the present embodiment of invention.

To aid in understanding the differences between an application, a document and pages, FIG. 3A illustrates a graphical representation of an application 346. An application 346 includes software and routines for generating a document 348 or the document 348 is generated by other tools associated with that application 346. In one embodiment, an application 346 includes different modules for performing tasks, such as speech recognition, or the modules are be purchased separately. The document 348 comprises pages 350a, 350b, 350c . . . 350n. In one embodiment, a user purchases an application 346, generates a document 348 and provides information to fill out the pages 350a . . . n.

Each page of a document and the document itself includes a log of metadata. FIG. 3B illustrates one embodiment of a log entry 370 of metadata that is generated for each page and for a document log. In this example, a unique device ID 351 identifies the most recent computing device, such as a portable computing device 102 that makes a modification to the document. The application version GUID 352 is the identifier for the application being used. The user ID 354 identifies the most recent user to modify the document. The price 356 includes the price of the purchased application, the price of any subsequent actions to be performed, etc.

The transaction step IDs 358 include all the steps that have been performed and will be performed on the application. This is used to track the status of the application as it is transmitted between portable computing devices 102 and the workflow server 106. For example, a portable computing device 102 purchases the application and inputs audio information into the document. The document is transmitted back to the workflow server 106 for translation services. Once the speech is translated to text, the translated document is transmitted back to the portable computing device 102. All these steps are recorded and tracked by the transaction step IDs 358.

The previous hash value 360 is the hash value of the prior log entry in the local log of the last computing device that modified the document. The hash of the result data 362 is a hash calculation of the results from this particular transaction. Each hash includes the cryptographic hash of the previous log entry. By including the hash value of the prior log entry, this information can be used at a later time and examined for verification by comparison with other entangled log entries. In another embodiment, the log entry 370 also includes a hash of the document or perhaps multiple hashes of portions of the document.

The cryptographic hashes are also called content based identifiers (CBIs) because they can be used to index data in addition to their use for verification. The CBI of the recent log entries are stored in other log files and published via email or other protocols. Maintaining logs that allow recreation of the document and the CBI for any data needed to redo the operation in the log file. The data itself is stored in the metadata directories for the pages and document, as discussed in further detail with regard to FIGS. 4A-C.

Figure 3C:
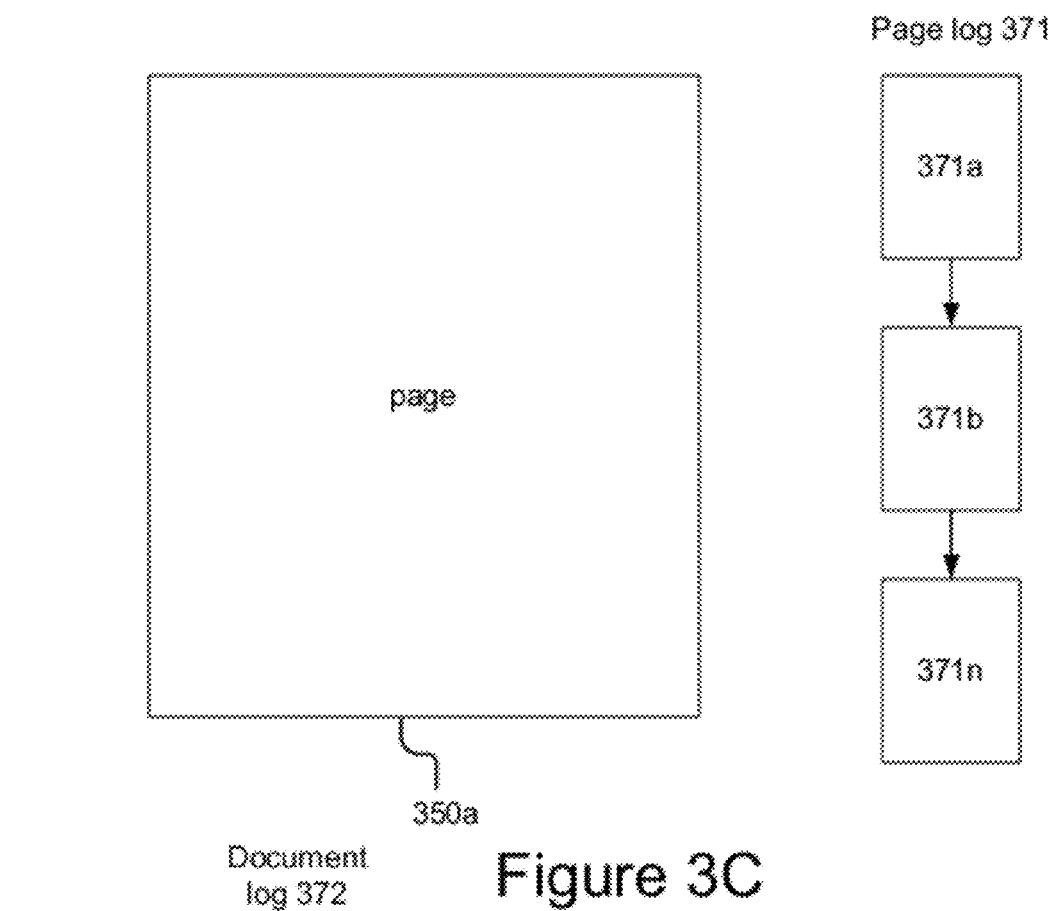
FIG. 3C is a graphical representation of a page log in accordance with the present embodiment of invention.

Turning now to FIG. 3C, a page 350a-350n (See FIG. 3A) and its corresponding page log 371 is illustrated. The document 348 comprises pages 350a that each include their own page log 371. When a change is made of the document, a new hash is generated and the log is updated. Thus, 371a is a log for the original document, 371b is a log after a change is made to the document and 371n is a log after n changes have been made to the document.

Figure 3D:
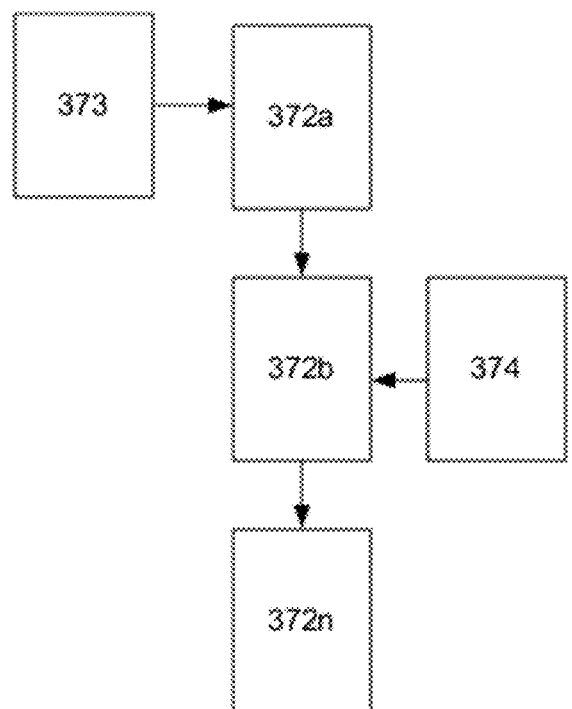
FIG. 3D is a graphical representation of a document log in accordance with the present invention.

FIG. 3D illustrates an example document log 372. A document log 372 is associated with the document as a whole and is referred to as an entangled log when the document log 372 includes log entry hashes from different computing devices. The document log 372 is stored as a file or collection of files associated with the document. In addition, the document log 372 is stored on the workflow server 106, which coordinates transmission of the document based on the authenticity of the document log. Further details regarding authentication of the logs can be found in U.S. patent application Ser. No. 13/020, 643, filed on Feb. 3, 2011 and titled "Creation of Signatures for Authenticating Applications," which is herein incorporated by reference in its entirety.

In this example a portable computing device 102 generates a page log 373 after the portable computing device 102 makes modifications to the document. The page log 373 is included in the document log 372a for the entire document. The document log 372a does not list the exact modification that was made to the page. Instead, the document log 372a includes a hash of the changes that were made and a pointer to the location of information inside the directory, which is described in FIGS. 4B and 4C. Another modification is made to a page log 374 and page log 374 is included in the document log 372b. All n modifications are included in the document log 372n.

Logging Module 214

Figure 4A:
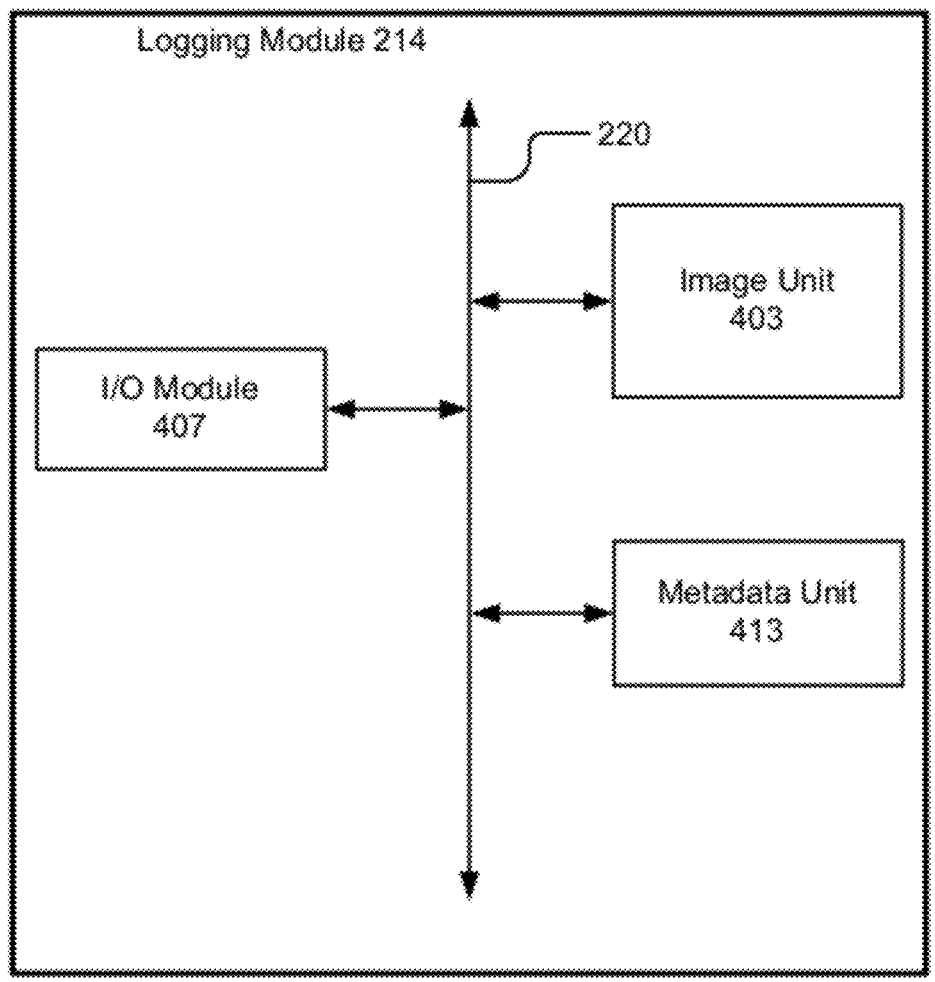
FIG. 4A is logging module in accordance with the present embodiment of invention.
Figure 4B:
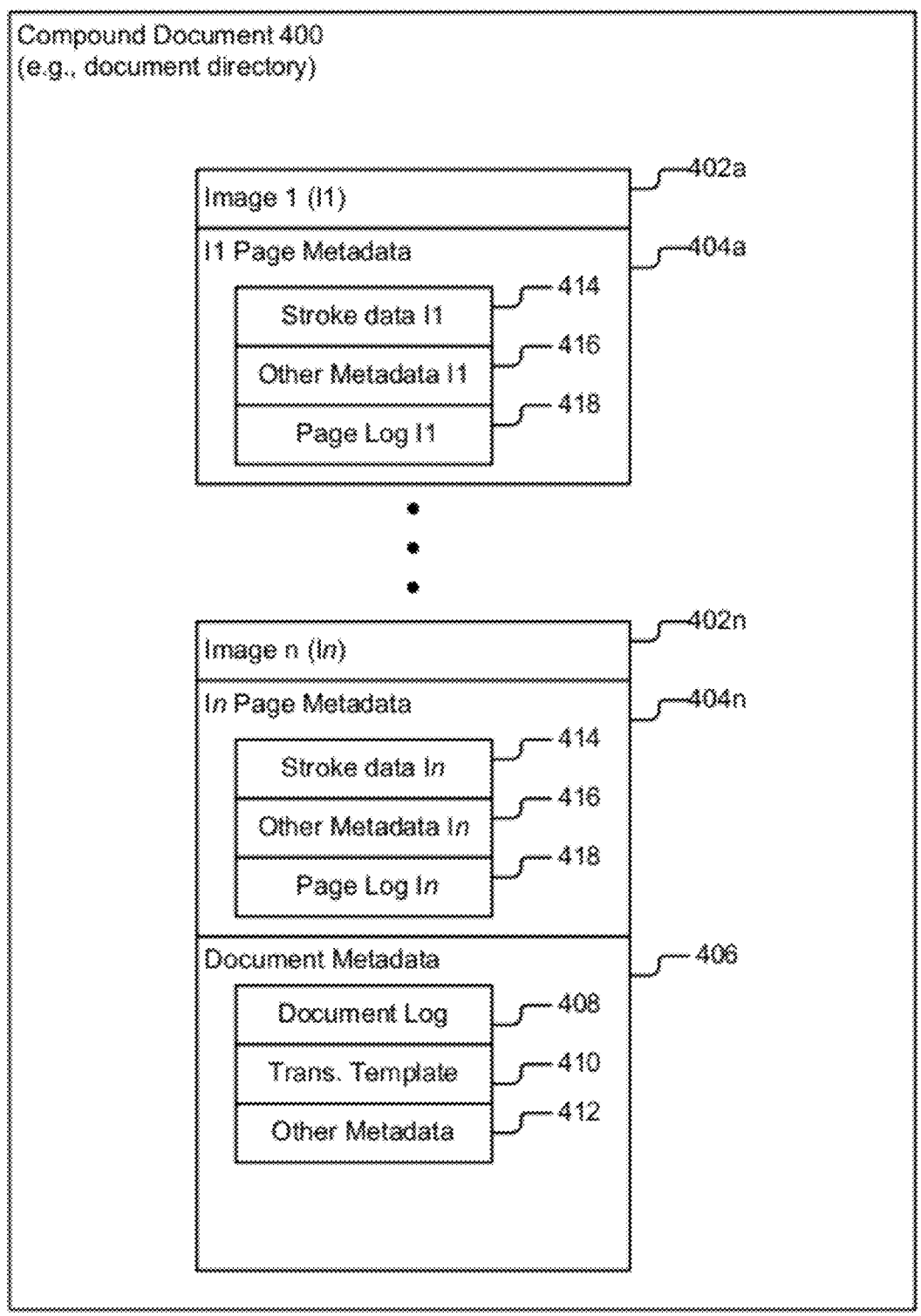
FIG. 4B is a block diagram representing an embodiment of a compound document in accordance with the present embodiment of invention.
Figure 4C:
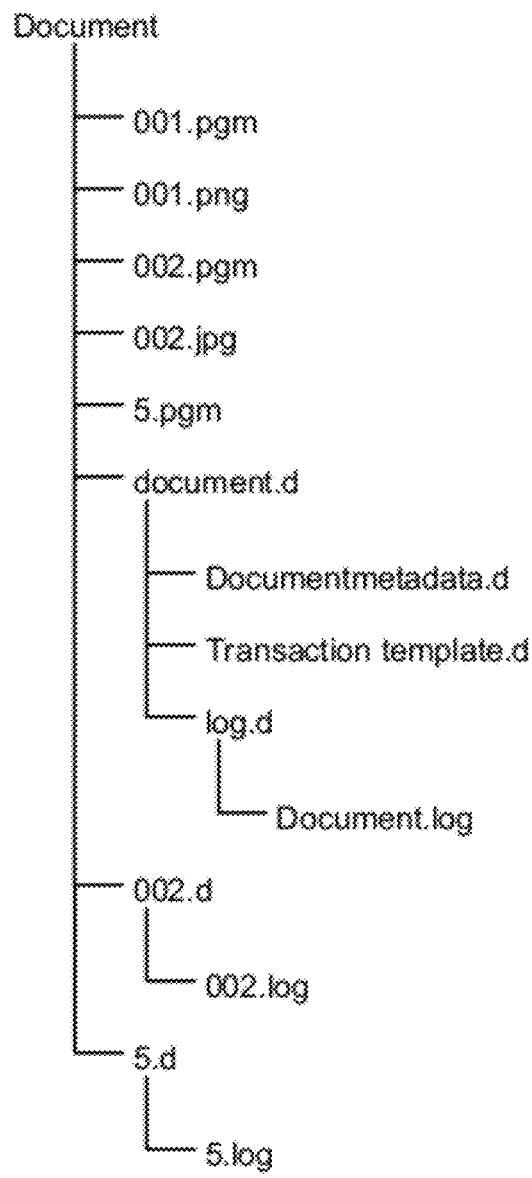
FIG. 4C is one example of a compound document in accordance with the present embodiment of invention.

FIG. 4A illustrates an embodiment of a logging module 214 that comprises an input/output module 407, an image unit 403 and a metadata unit 413 that are coupled to the bus 220. The input/output module 407 receives data from other modules, such as stroke segments from the stroke capture device and module 208 and transmits the images to the image unit 403 and the metadata to the metadata unit 413.

The image unit 403 receives an image and generates a raster form of the image that is transmitted to the metadata unit 413 for incorporation in a metadata directory for the page. The metadata unit 413 receives all metadata and stores information about changes on a page such as page creation, writing on a page and adding an image to a page. The logging module 214 also stores a timestamp for when a page is submitted or otherwise copies from one place, such as a portable computing device 102 to another place, such as the workflow server 106.

FIG. 4B illustrates a compound document 400. In this example, the compound document 400 includes a plurality of images 402a-402n that are denoted in the figure as Image 1(I1) . . . Image n (In). Each of the plurality of images 402a-402n may include associated page or image metadata 404a-404n. The page or image metadata 404a-404n includes stroke data 414, other metadata 416 and page log 418. Furthermore, the entire compound document 400 includes document metadata 406. The document metadata 406 includes a document log 408, location and acceleration logs 410 and other document metadata 412.

The present invention advantageously stores the pages of the compound document 400 as images. This is particularly advantageous because it avoids requiring that the portable computing device 102 support a wide range of document formats. Providing pure images, i.e. not documents requiring rendering, to the portable computing device 102 ensures a consistent view and eliminates problems with inability to render fonts or other graphical commands.

When a page is created a raster form of the image is saved in the metadata directory for the page. The page log 418 is initialized with a "start log entry." The start log entry includes the current time as measured on the portable computing device 102 and might include a CBI from another log to establish that the page was created after the time of that CBI. In addition to the "start log entry," the logging module 214 stores a "page created" entry that includes the hash of the raster form of the starting image.

If the CBI of the page log 418 is published after the page is created, then it is possible to use that CBI to check if the page log 418 has been tampered with. If the page log 418 has not been modified, then the steps in the page log 418 can be followed. At first the only entry is the 'page created' entry. The CBI for the page image can be checked, and if it matches the raster image in the page metadata directory 404, then the format of the initial page is known not to have been tampered with since creation.

When strokes are added to a page, they are displayed in raster format on the display device 206, and they are stored in a stroke data file 414 in the metadata directory 404 for the page. A log entry is added to the page log 418, typically including the time and the CBI for the stroke file 414. Thus at a later point, if the page log 418 is verified, then the stroke data file 414 can be verified and the background image can be verified, if all of these items have not been modified then the stroke data file 414 can be used to redraw the strokes on the background image, thus recreating the page as it looked after strokes were added.

Note that to maintain pixel accuracy, the present invention uses a known algorithm to convert the stroke data file 414 to pixels. If multiple algorithms are used, or an algorithm is used with some parameters, e.g. stroke width, then the entry for 'strokes added' should include information identifying the exact algorithm used and the parameters to that algorithm.

Just as strokes may be added to a page, images may be added to a page. In this case the image added to a page should be stored in raster format in the page metadata directory 404. The operation "image added" and the location and scale used to add the image e.g. (500,300) should be stored in the page log 418, along with the CBI of the raster form of the image.

Many applications can operate on the portable computing device 102 that only update pages by adding images or adding strokes. If additional changes are made to the page then log entries for these operations must be defined, the name of the operation must be stored in the log, and the hash of the data must be stored in the log. When a log entry is added to a page log 418, the unique device ID 351 of the portable computing device 102 is included in the entry. If a device is configured with a private key, then it might provide a digital signature of the stroke data 414 to indicate that the stroke date 414 was captured on the portable computing device 102. This signature is included in the page log 418.

Just as a page log 418 is created in a page metadata directory 404 when a new page is created, the logging module 214 creates a document log 408 in the document metadata directory 406 when a document is formed. This document log 408 is used to record items including the addition of pages to a document, when pages are viewed, and when the document as a whole is submitted. Also changes to document level metadata 406 are recorded in this document log 408. While it is possible to repeat the information stored in a page log 418 in the overall document log 408 (along with a page identifier), the logging module 314 records just the CBI for the last entry in page log 418 when the page log 418 is updated. By storing the CBI from the page log 418 in the document log 408, the document log 408 is used to verify all the page logs 418. Whenever new entries are made to a page log 418, then an entry needs to be made to the document log 408, specifying that the page log of the altered page has been altered, and incorporating the most recent CBI of the altered page log 418. The CBI from the document log 408 is then published by email or other methods, rather than needing to publish information from each individual page log 418.

Entries in the document log 408 are similar to the page logs 418: they should include an "operation" and the CBI of any data necessary to complete the operation. In the case of a page view, the log entry includes the identifier for the page, along with the CBI of the current raster format of the page image. Note that some log formats allow the direct inclusion of text and CBIs in the same log entry, while other log formats only allow CBIs. In the event the log format only allows CBIs, the text for the "operation" is stored in a file in the document metadata directory 406 and the CBI of that file included in the log. When the "operation" has no parameters, e.g. "strokes added" then the same file with the text of the operation can be stored once in the metadata directory and the CBI used multiple times. Of course the CBI of the actual stroke file is expected to differ in most cases, and the log entries have time stamps which differentiate individual entries. However, it is possible that a particular log entry with an identical set of log entry data will be written to multiple places with an identical CBI. This in no way invalidates the verification properties of either the page log 418 or the document log 408.

In addition to incorporating the changes made to page logs 418, the document log 408 stores certain types of information that apply to the document as a whole. For example, optical character recognition (OCR) information and barcode recognition information are saved in the page log 418. Video data is saved in the page log 418 as, for example, a link. Speech recording is more complicated because it is saved to the document log 408 if the information is not associated with a particular page. However, there are instances where the recording is linked to a specific page. For example, a patient fills out a form and a doctor records speech while flipping through the pages. In this situation the text that is associated with a particular page is saved to the page log 418 and the complete speech file is saved to the document log 408.

It is an important property of the invention that a given page log 418 is separable from its document log 408. A particular page log 418 can be copied independently of the document log 408, with verifiability intact, including the ability to verify that the separated page copy was originally part of the compound document 400 and its document log 408.

In one embodiment, the document metadata 406 also includes a transaction template 410 to identify the services to be provided and/or completed and other metadata 412. The transaction template 410 is a standard metadata item of the compound document 400. The transaction template 410 either includes a list of service transactions or is a uniform resource locator (URL) pointing to a description of service transactions. When the compound document 400 is to be processed by the workflow server 106, then the transaction template must be attached to the compound document 400. Over the life of the compound document 400, more than one transaction template, and the associated processing, might be applied. The most recent transaction template 410 is always used for processing. The transaction template 410 includes a list of entries, each of which is defined as a step identifier including: an input type, an output type, and a preferred service provider.

Document Format

In one embodiment, the basic format or structure of the document is a directory of including one or more files and directories. Inside the directory are a series of page images, as well as optional metadata. The metadata may be associated independently with each page, and/or metadata may be associated with the document as a whole. Such metadata is stored in further nested directories, and is optional. In one embodiment, each pages of the document is stored as an image. This is particularly advantageous because it avoids requiring that the portable computing device 102 support a wide range of document formats. Providing pure images, i.e. not files requiring rendering, to the portable computing device 102 ensures a consistent view and eliminates problems with inability to render fonts or other graphical commands. In one embodiment, the images are in one of the following file formats: JPEG, JPEG2000, JPM, PNG, PDF, TIFF or simple portable bit map (PBM) file format. Those skilled in the art will recognize that the document directories can be transferred and stored as standard ZIP format archives. Those skilled in the art will further recognize that many image formats are suitable for inclusion as page images, and that the above list represents a useful subset of existing formats that is in no way intended to limit the scope of the invention.

Multiple page image files which share the same initial name segment are considered to be alternate representations of the file, of equivalent quality, and the presentation module 222 may choose the representation most convenient for its use. So, for example, a directory with the following contents: 001.pgm, 001.png, 002.pgm, 002.jpg and 5.pgm would yield a document with three pages. The first page is represented by one of two files, 001.pgm or 001.png. The second page is represented by 002.jpg or 002.pgm, and the third page is represented by 5.pgm. In one embodiment, a segment of the name can be used to specify the resolution or size of any image to allow a device to easily choose an image. For example, there might be images page001.600×800.pgm and page001.cif.pgm where 600×800 or common intermediate format (cif) identifies the resolution of the images.

Each of the plurality of images may include associated page or image metadata. The page or image metadata includes stroke data, other metadata and log data. For example, the page or image metadata may also include picture rectangles that identify areas in images at which capture images may be embedded or placed. Furthermore, the entire document includes document metadata. The document metadata includes a document log and other document metadata.

The metadata for the document is represented by files stored in directories, which are associated with either the document as a whole or with individual pages. In one embodiment, the metadata directories have the suffix ".d" as the final pair of characters in the directory name. Information within a metadata directory is stored in a file or subdirectory, which is expected to have a unique name segment. Organizations are encouraged to name them using unique identifiers—for example, the traditional Java reversed domain name method. A metadata directory may itself include subdirectories, whose contents are ordered and defined according to the creator of that directory. General policy is that applications which do not understand the contents of a metadata file or directory should preserve the contents and should not alter it. As a given metadata file or directory is self contained, there should not be any dependencies between items of metadata unless they are included in the same directory. Items of metadata are connected either to the document as a whole, or a specific page.

In one embodiment, the document metadata 406 is global metadata and is stored in a directory including one or more files, named "memphis.document.d". This directory is included at the top level directory. It is useful to store a log of actions associated with a document in the document metadata. In one embodiment, the logging module 214 also stores a version of an "original" document as document metadata. For example if the document was formed from a PDF, Microsoft Word, Microsoft Excel or other document, the original format document may be saved in the metadata directory.

In one embodiment, the page or image metadata is named with the same name segment as the page image, and ends in the extension ".d". For example, if the page image is named "page.001.jpg", the page metadata directory should be named "page.001.d" to indicate that it is associated with that page. In another embodiment, the page or image metadata includes the original image in some format for each page in the page metadata directory. This metadata is created as soon as the document is created e.g. by storing a raster format both at the top level directory and in the page metadata directory, or a copy of the original raster format may be stored when the page image is first changed. In other embodiments, the page or image metadata includes log data. This log data represents a log for changes applied to each page in the metadata directory for the page. The other metadata is used to store any other data related to a particular page or image. For example, if images are added to a page, it is useful to store these added images in the page metadata directory. An image might be added to a page for reasons similar to "stamping" a paper page, e.g. "received" or "submitted" thus providing a visual indication of the status of the page to any reader.

Multiple page image files which share the same initial name segment are considered to be alternate representations of the file, of equivalent quality, and the presentation module 222 may choose the representation most convenient for its use. So, for example as shown in FIG. 4C, a directory with the following contents: 001.pgm, 001.png, 002.pgm, 002.jpg and 5.pgm would yield a document with three pages. The first page is represented by one of two files, 001.pgm or 001.png. The second page is represented by one of two files, 002.jpg or 002.pgm, and the third page is represented by 5.pgm. In one embodiment, a segment of the name can be used to specify the resolution or size of any image to allow a device to easily choose an image. For example, there might be images page001.600×800.pgm and page001.cif.pgm where 600×800 or cif identifies the resolution of the images. In another embodiment, the alternate resolutions might be stored with a similar naming convention in the "page001.document.d" metadata directory.

Stroke Capture Device and Module

Figure 5A:
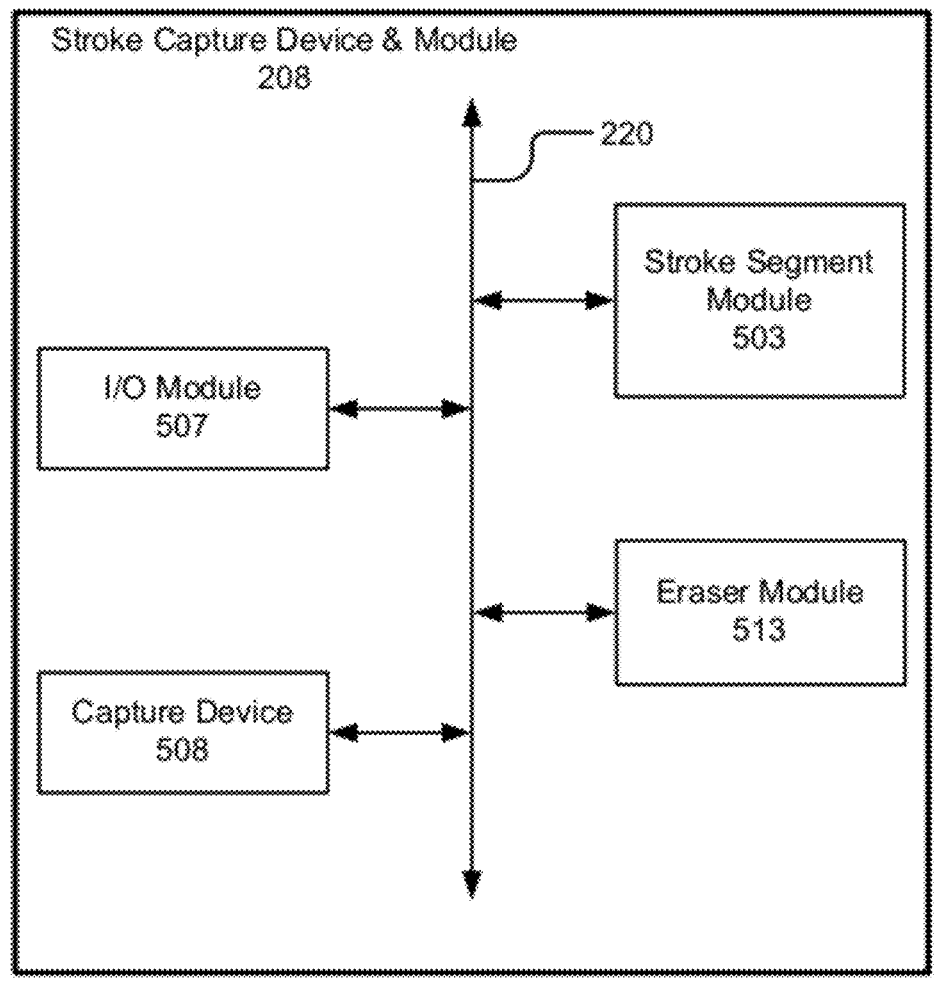
FIG. 5A is an embodiment of the stroke capture device and module in accordance with the present embodiment of invention.

FIG. 5A is one embodiment of a stroke capture device and module 208 that comprises an input/output module 507, a capture device 508, a stroke segment module 503 and an eraser module 513 that are coupled to the bus 220. In one embodiment, the stroke recognition portions of the stroke capture device and module 208 are processed with the stroke capture module 299 that is stored on the workflow server 106. For example, the stroke capture device and module 208 on the portable computing device 102 receives the stroke data and transmits the stroke data to the stroke capture module 299 on the workflow server 106 for performing stroke recognition. However, these functions will be described for ease of simplicity with regard to the stroke capture device and module 208 that is stored on the portable computing device 102.

The capture device 508 captures strokes as a user moves a stylus or a finger over the display device 206. The stroke information is transmitted to the stroke segment module 503 for dividing the strokes into stroke segments to use in character recognition. The stroke segments are associated with particular characters and classified as being associated with the character. For example, segments one through five are associated with an "e" and segments six through 10 are associated with an "n." The stroke information is then transmitted to the logging module 214 and stored as stroke data 414 for any strokes that are applied to a page in the page's metadata directory.

In the simplest form, a stroke is just a list of x-y locations where the stylus, pen or other pointing device, like a finger, was sensed. This information is associated with the background image that was showing when the strokes were written and it should be possible to scale and orient the strokes so that it is later possible to match what the user saw. In addition to the x-y locations, the stroke segment module 503 captures the time of each stroke or each point, the pressure of the stylus, which stylus was used or which end of a stylus was used (if the hardware supports this). It may even be useful to store information about the algorithm being used on the pen to convert pen strokes into pixels e.g. what width and color pen are lines being drawn in, and how are points selected between sensed points.

The stroke segment module 503 classifies segments in a variety of ways. In a first embodiment, it is stored as simple text based lists comprising an x-value, a space, a y-value, and a line feed, with the end of a stroke indicated by a point outside the drawable space. For example, the computing device 102 might allow x coordinates between 0 and 1200 and y coordinates between 0 and 1600, a point recorded as "−1, −1" is not in the drawable space and can be used to terminate the stroke.

In a second embodiment, the stroke segment module 503 generates stroke data 414 using a binary storage technique allocating the appropriate number of bits or bytes to each point, e.g. 2 bytes per x coordinate and 2 bytes per y coordinate, this is more memory efficient. In a third embodiment, the stroke data 414 is stored as InkML. InkML is an XML format that allows storage of strokes and a variety of additional data, specified by the W3C and is described in the technical report, Ink Markup Language (InkML), W3C Working Draft 23 Oct. 2006. InkML allows some memory efficiency as well, and if necessary the data can be compressed by a text compressor. Once the segments are defined, the stroke segment module 503 performs character recognition to associate the segments with characters.

Figure 5B:
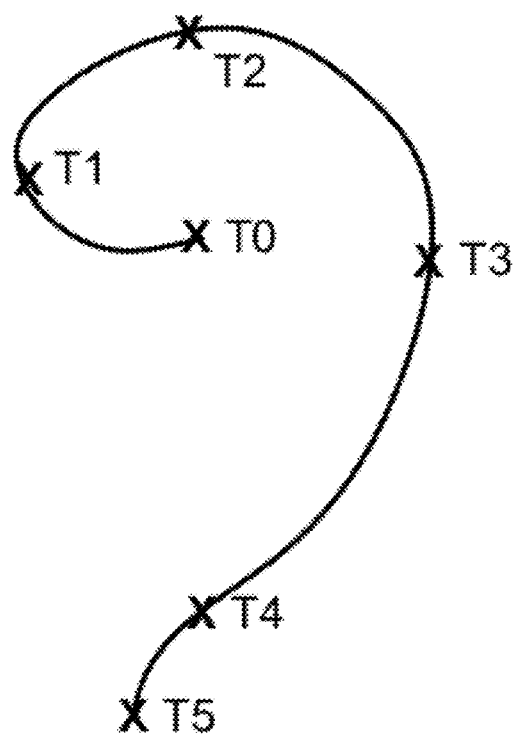
FIG. 5B is a graphical illustration of how a stroke is divided into segments and logged at different times in accordance with the present embodiment of invention.

FIG. 5B is a graphical representation of a stroke that has been divided into segments. In this example, the stroke is divided into segments that are organized according to time starting with time zero (T0) and ending with time five (T5). Segment one occurs at time zero to one. Segment two occurs at time one to two. Segment three occurs at time two to three. Segment four occurs at time three to four. Stroke five occurs at time four to five.

In one embodiment, the stroke capture device and module 208 receives erased data. The input/output module 507 transmits the erased data to the eraser module 513, which identifies the segments that have been erased and notifies the logging module 214 of the changes made to the list of segments. The logging module 214 removes the segments that were erased from the stroke data 414. In one embodiment, the timestamps are not updated to correspond to the time at which segments were erased. Instead, the stroke data 414 simply removes segments that were erased and keeps the same timestamps.

Figure 5C:
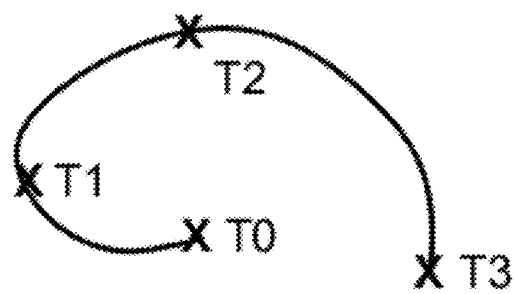
FIG. 5C is a graphical illustration of a stroke after a segment has been erased in accordance with the present embodiment of invention.
Figure 5C:
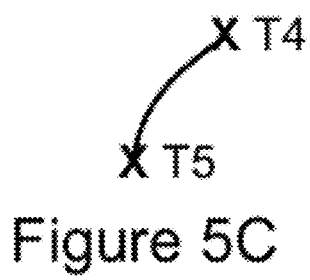

FIG. 5C is a graphical representation of a stroke that has been partially erased. In this example, segment four between time three and time four was erased. As a result, the eraser module 513 notifies the logging module 214 that the segment between time three and time four no longer exists. The stroke segment module 503 receives the modified information and performs the classification on the affected segments to determine if the erasing changed the classification. For example, a user erases a portion of a segment to make it more clear that the user intended to make two different characters, such as an "l" and an "i" instead of a "k." At the end of a session the logging module 214 generates a new page of stroke data 414 for every page where changes were made. Because the erased segments are not recorded as different times, the changed are recreated by comparing the two different versions of the log files.

Image Capture Module 228

Figure 6:
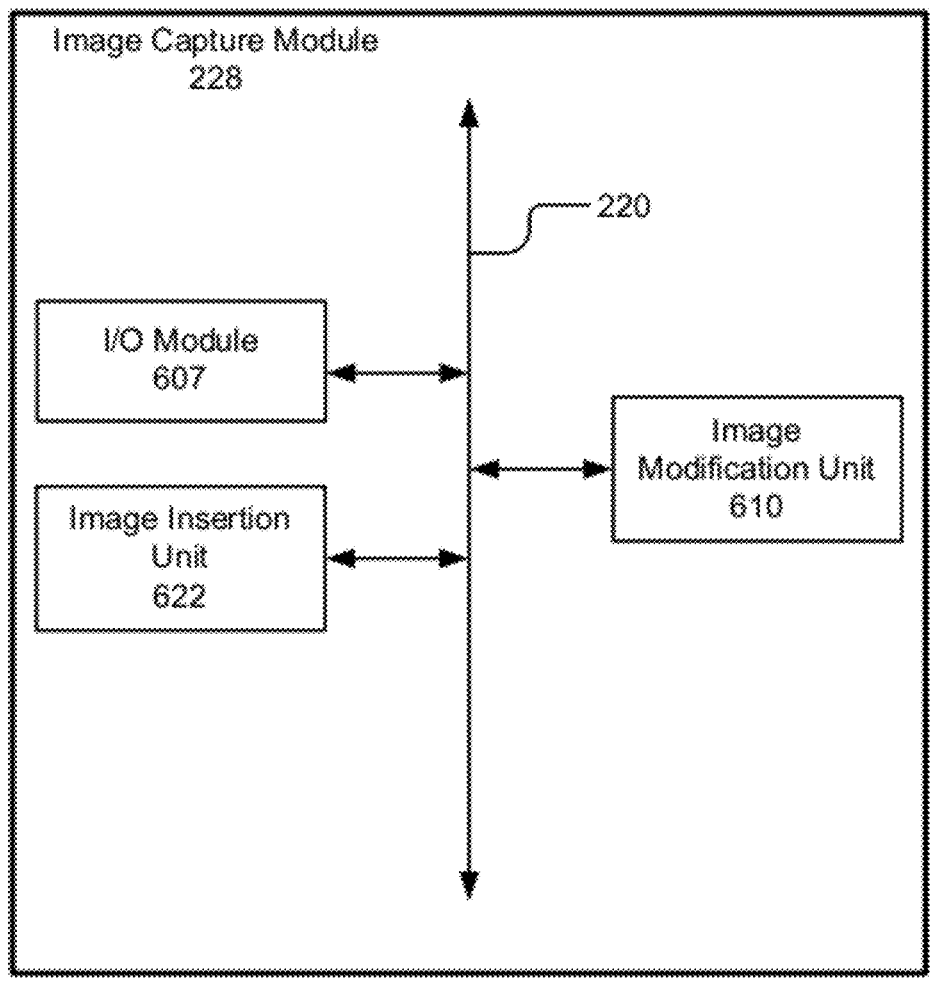
FIG. 6 is a block diagram of an embodiment of the image capture module in accordance with the present embodiment of invention.

FIG. 6 is one embodiment of an image capture module 228 that comprises an input/output module 607, an image modification unit 610 and an image insertion unit 622, which are coupled to the bus 220. The input/output module 607 receives an electronic image and transmits the image to the image modification unit 610 for processing. In one embodiment the input/output module 607 receives an image from an input device 210 such as a camera. In another embodiment, the input/output module 607 receives an image through the communication unit 207 from another source.

The portable computing device 102 displays a document. The metadata module 212 extracts data from the image and the document and transmits the extracted metadata to input/output module 607. The input/output module 607 transmits the metadata to the image modification unit 610, which uses the metadata to determine whether the document includes an image region that is designed for the image. If an image region is present, the image modification unit 610 checks whether the metadata includes details on the size of the image region and scales the image to fit. The image insertion unit 622 then inserts the image in the image region. If an image region is not present, the image insertion unit 622 inserts the image at the end of the document.

In one embodiment, the image modification unit 610 generates a lower resolution version of the image that is displayed within the document. One advantage of using the lower resolution image is that the document loads faster. The logging module 214 attaches the full resolution version to the page data. As a result, a user can access the page metadata 404 to view the full resolution version.

Additional information about process of attaching an image to a document can be found in U.S. patent application Ser. No. 12/826,578, filed on Jun. 29, 2010 and titled "Automatic Attachment of a Captured Image to a Document Based on Context," which is herein incorporated by reference in its entirety.

Methods

Referring now to FIGS. 7-9C, the methods of the present embodiment of invention will be described in more detail.

Figure 7:
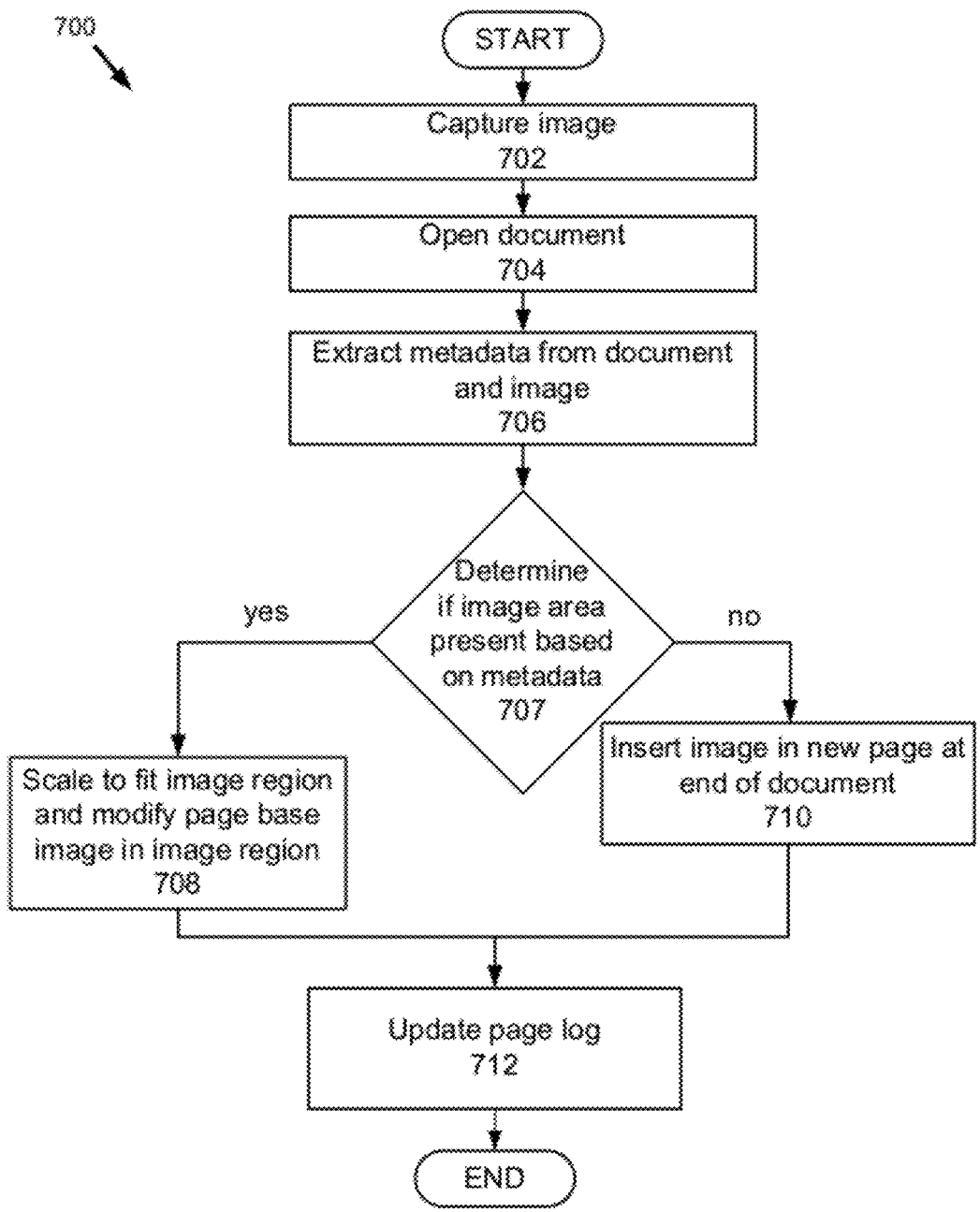
FIG. 7 is a flow diagram illustrating the insertion of an image into a document.

FIG. 7 illustrates one embodiment of a method 700 for inserting images into a form in accordance with the present embodiment of invention. First, a user captures 702 an image and the image is transmitted to the image capture module 228. In one embodiment, the image is captured by using a portable computing device 102 that includes a camera for taking pictures. In another embodiment the image is captured using a different device and the portable computing device 102 receives the image via the transfer module 216. The metadata module 212 opens 704 the document and extracts 706 metadata from the image and the document into which the image is inserted. The metadata for the image includes a size of the image, resolution of the image, image format, etc. The metadata for the document includes information regarding image areas, i.e. wells that are present in the document where an image belongs and if image areas are present, the size of the images areas.

The image capture module 228 determines 707 whether there is an image area present in the document based on the document metadata. If the image area is present, the image capture module 228 scales 708 the image to fit the image region and modifies the page base image in the image region. If there is no image area present, the image capture module 228 inserts 710 the image in a new page at the end of the document. The logging module 214 updates 712 the page log 418 to include the new image information.

Figure 8:
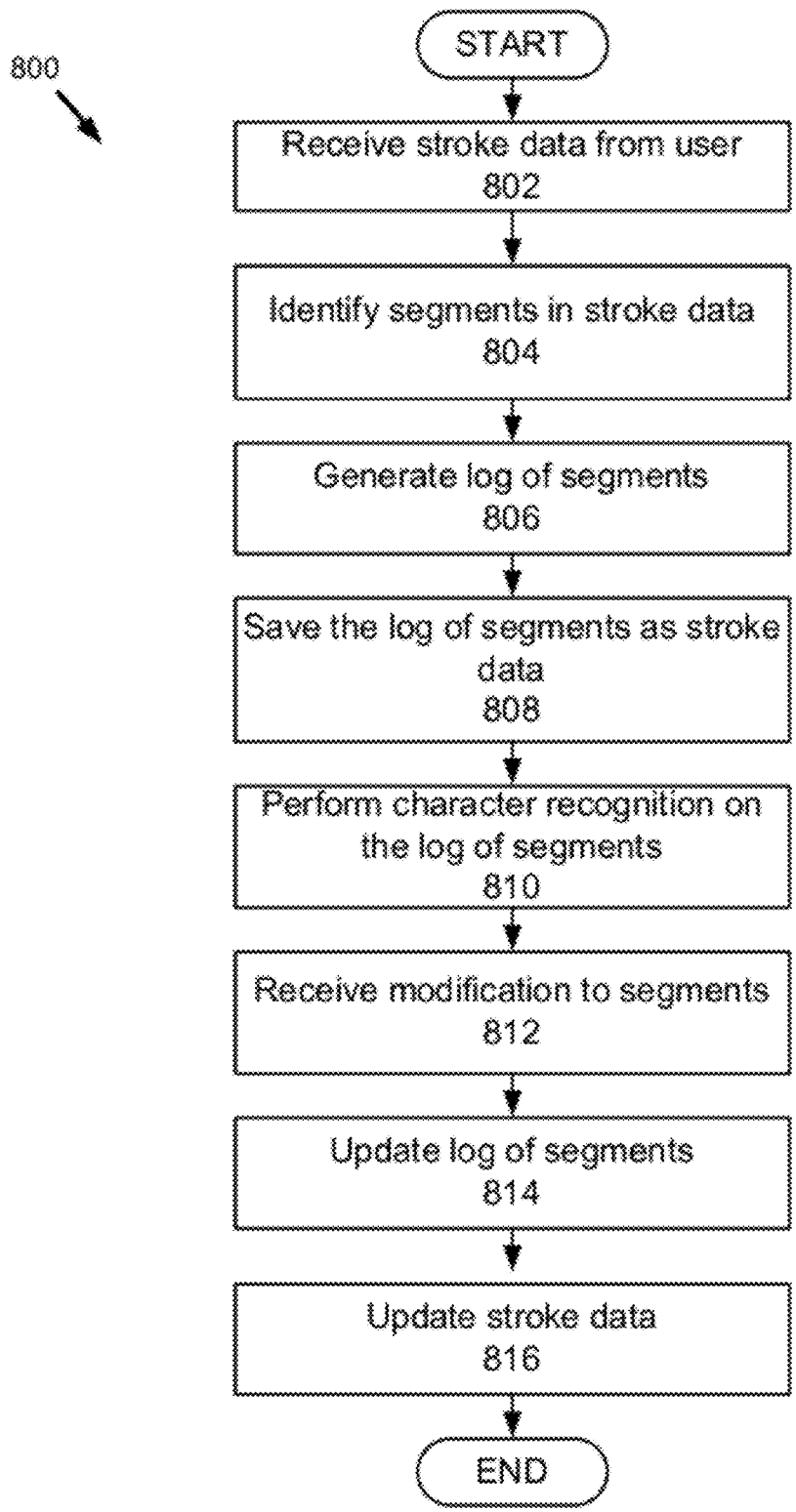
FIG. 8 is a flow diagram illustrating the generation of a log of stroke data in accordance with the present embodiment of invention.

FIG. 8 illustrates one embodiment of a method 800 for creating and updating a log of stroke data in accordance with the present embodiment of invention. For this example, the stroke capture device and module 208 receives 802 the stroke data and processes the stroke data on the portable computing device 102. In another embodiment the stroke capture device 208 receives 802 the stroke data and transmits the stroke data to the stroke capture module 299 that is stored on the workflow server 106. Persons of ordinary skill in the art will recognize that the processing steps could also occur on the workflow server 106.

The stroke capture device and module 208 identifies 804 segments in the stroke data 804 and generates 806 a log of segments. The log includes the coordinates for each segment and the time at which they were produced. The logging module 214 saves 808 the log of segments as stroke data 414 for the page where the stroke data was input. In one embodiment, the stroke capture device and module 208 performs 810 character recognition on the log of segments. For example, the stroke capture device and module 208 classifies the segments as belonging to a particular character and performs word matching to determine whether the recognized characters correspond to a recognizable word. If not, the most likely word is used to revise characters that fail to match, such as replacing an "a" with an "e."

The stroke capture device and module 208 receives 812 modifications to the segments. For example, the portable computing device 102 receives input from an eraser on a stylus or a finger that erases a portion of the segment. The stroke capture device and module 208 updates 814 the log of segments. The timing of the segments is kept the same. As a result, after a segment is erased it will appear as though the segment did not exist in the first place. The only way to determine what modifications were made is to compare the different versions of stroke data 414. The logging unit 214 updates 816 the stroke data 414 to reflect the modifications.

Figure 9A:
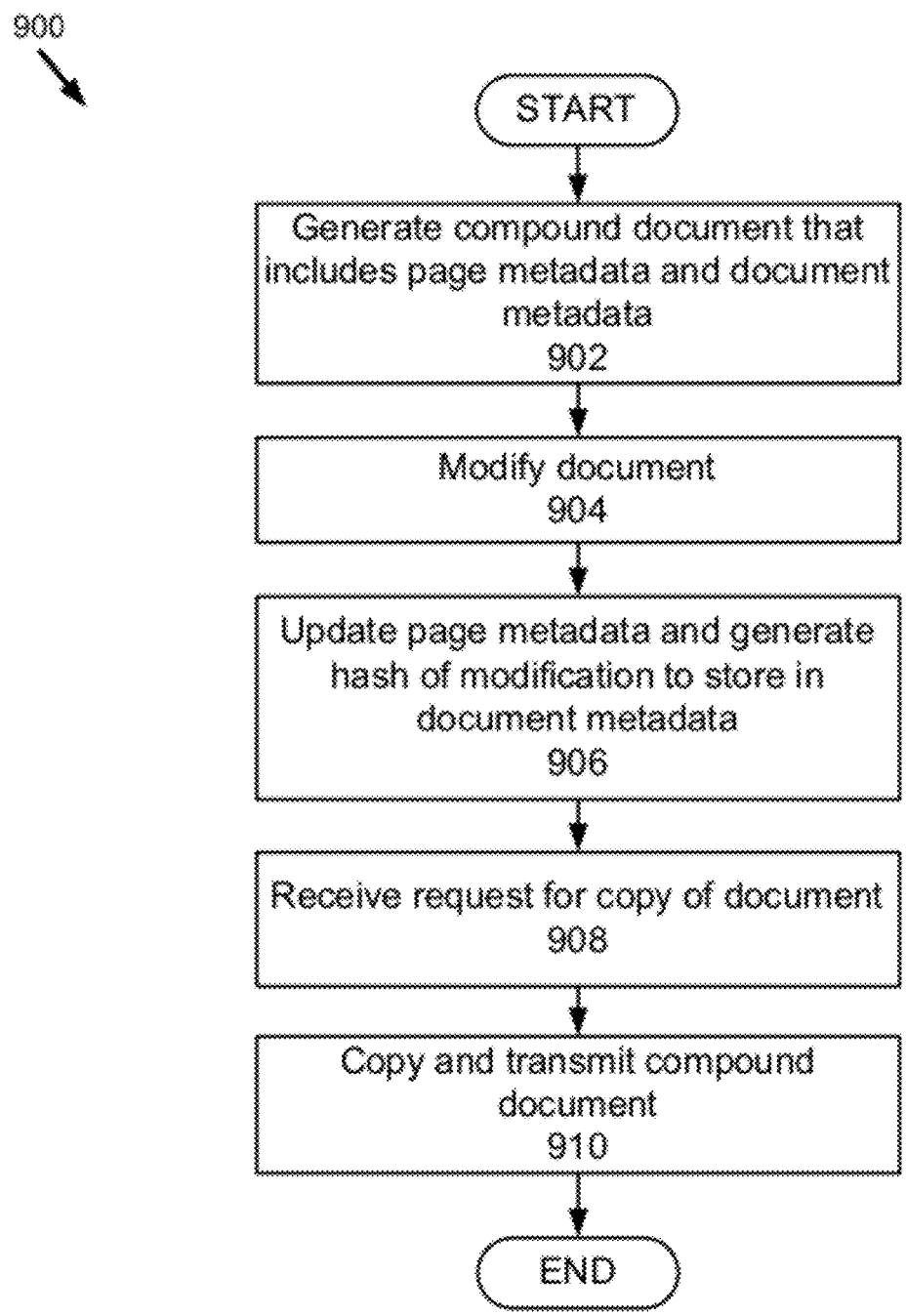
FIG. 9A is a flow diagram illustrating the steps for generating and copying metadata for a document in accordance with the present embodiment of invention.

FIG. 9A illustrates one embodiment of a method 900 for copying a document and the metadata associated with the document in accordance with the present embodiment of invention. Although this example is described with reference to a logging module 214 stored on a portable computing device, persons of ordinary skill in the art will recognize that the steps could also be performed by the logging module 298 stored on the workflow server 106. After a document is created, the logging module 214 generates 902 a compound document 400, i.e. a document directory that includes both page metadata 404 and document metadata 406. The page metadata 404 is associated with a particular page in the document and includes an image of the page, stroke data, text placed on the page, changes made to the page, etc. The document metadata 406 includes a hash of changes made to each page, a pointer to the page metadata 404 where a modification occurred, metadata that applies to the entire document such as OCR or an audio file, etc.

A user modifies 904 the document. The logging module 214 updates 906 the page metadata 404 and generates a hash of the modification to store in the document metadata 406. The logging module 214 receives 908 a request for a copy of the document. The logging module copies 910 and the transfer module 216 transmits the compound document 400, which includes both the page metadata 404 and the document metadata 406.

Figure 9B:
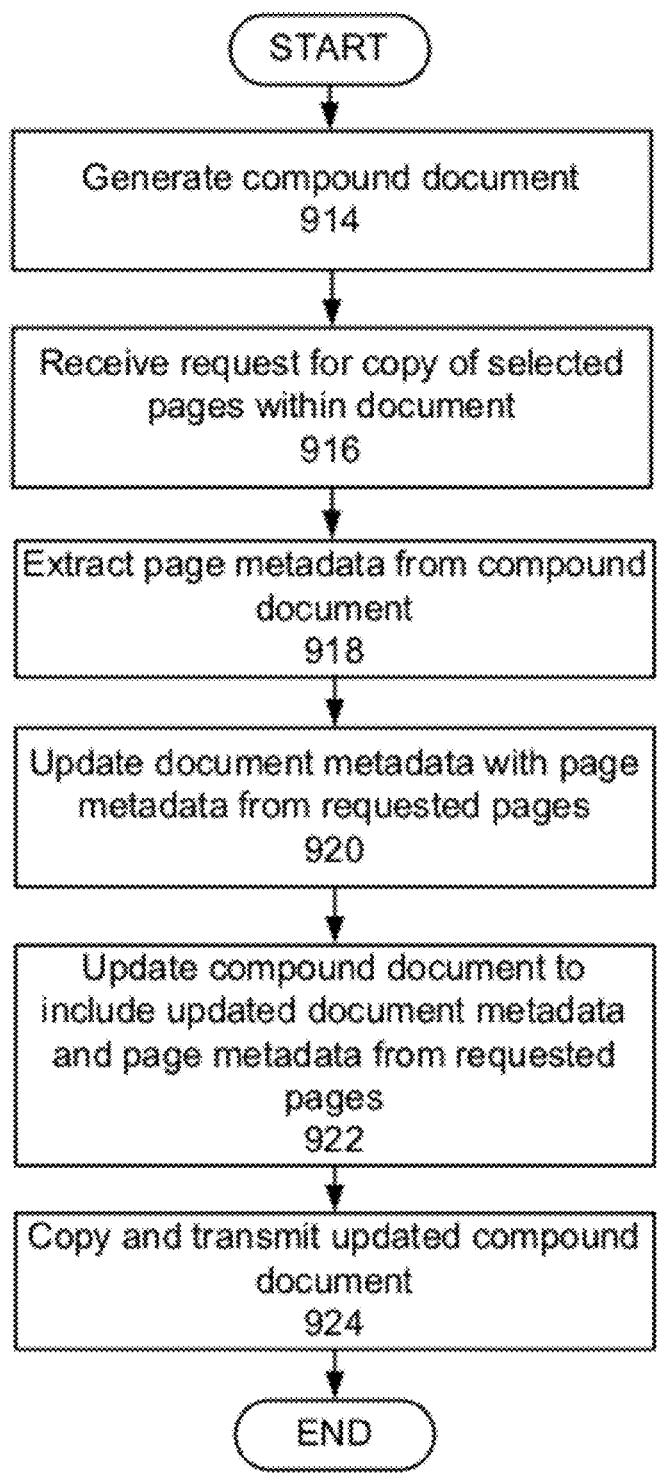
FIG. 9B is a flow diagram illustrating the steps for generating and copying metadata for some pages within a document in accordance with the present embodiment of invention.

FIG. 9B illustrates one embodiment of a method for copying selected pages in a document and the metadata associated with the selected pages in accordance with the present embodiment of invention. The logging module 214 generates 914 a compound document including page metadata 404 and document metadata 406. The logging module 214 receives 916 a request for a copy of selected pages within a document. The logging module 214 extracts 918 page metadata 404 from the compound document 400. The logging module 214 then updates 920 the document metadata 406 with page metadata 404 from the requested pages. Any metadata associated with pages that were not requested is discarded. This reduces the size of the compound document 400 and also maintains privacy in case pages were selected to avoid disclosing personal information. The logging module 214 updates 922 the compound document 400 to include updated document metadata 406 and page metadata 404 from the requested pages. The logging module 214 copies 924 and the transfer module 216 transmits the updated compound document 400.

Figure 9C:
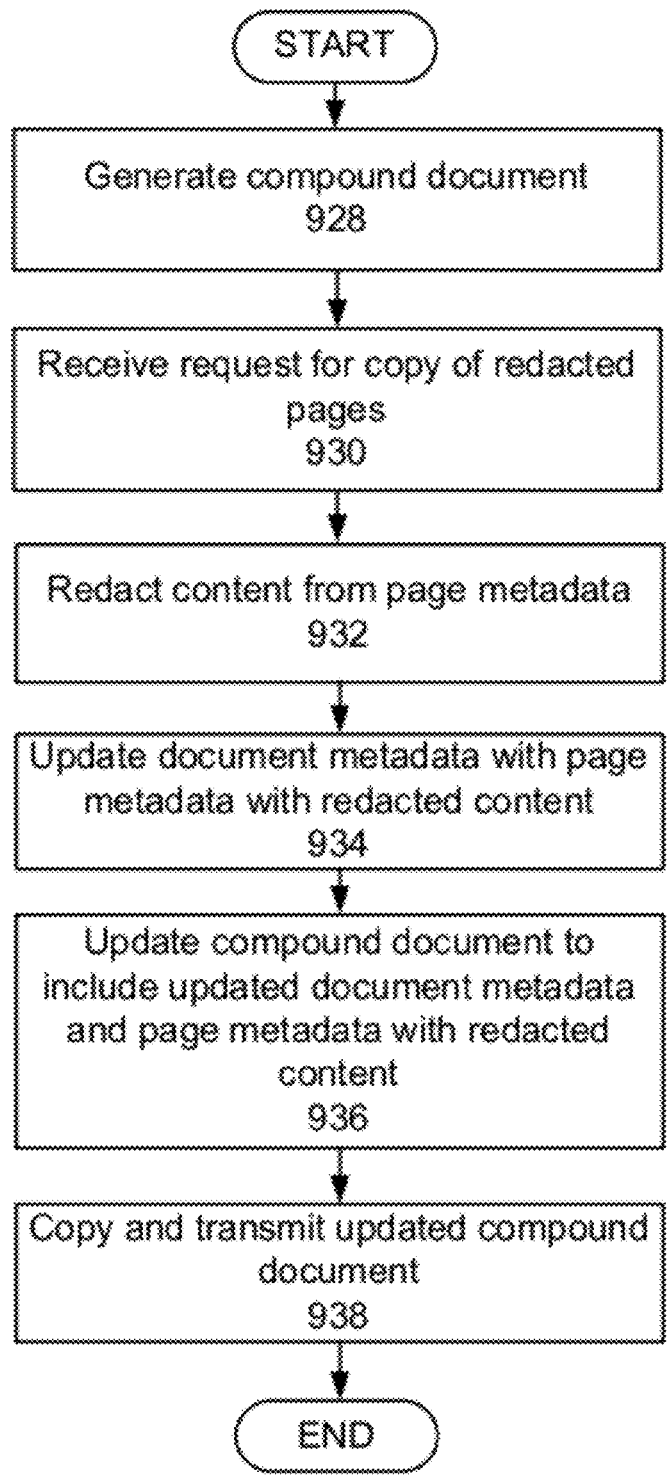
FIG. 9C is a flow diagram illustrating the steps for generating and copying metadata for redacted pages within a document in accordance with the present embodiment of invention.

FIG. 9C illustrates one embodiment of a method for copying pages with redacted content and the metadata associated with the redacted content in accordance with the present embodiment of invention. The logging module 214 generates 928 a compound document 400 including page metadata 404 and document metadata 406. The logging module 214 receives 930 a request for a copy of redacted pages within a document. For example, an employee transmits a document to show proof of employment to a rental company and he redacts certain information, such as his social security number to reduce the chances of identity theft. The logging module 214 redacts 932 content from the page metadata 404. The logging module 214 then updates 934 the document metadata 406 with page metadata 404 with redacted content. Because the document metadata 406 includes a hash of changes that were made to the pages, the authenticity of the redacted version of the pages can be verified by comparing the document metadata in the redacted version to the original version of the page and the hash information is identical up until the step when the redaction took place.

The logging module 214 updates 936 the compound document 400 to include updated document metadata 406 and page metadata 404 with redacted content. The logging module 214 copies 938 and the transfer module 216 transmits the updated compound document 400.

The foregoing description of the embodiments of the present embodiment of invention has been presented for the purposes of illustration and description. It is not intended to be exhaustive or to limit the present embodiment of invention to the precise document disclosed. Many modifications and variations are possible in light of the above teaching. It is intended that the scope of the present embodiment of invention be limited not by this detailed description, but rather by the claims of this application. As will be understood by those familiar with the art, the present embodiment of invention may be embodied in other specific documents without departing from the spirit or essential characteristics thereof. Likewise, the particular naming and division of the modules, routines, features, attributes, methodologies and other aspects are not mandatory or significant, and the mechanisms that implement the present embodiment of invention or its features may have different names, divisions and/or documents. Furthermore, as will be apparent to one of ordinary skill in the relevant art, the modules, routines, features, attributes, methodologies and other aspects of the present embodiment of invention can be implemented as software, hardware, firmware or any combination of the three. Also, wherever a component, an example of which is a module, of the present embodiment of invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present embodiment of invention is in no way limited to implementation in any specific programming language, or for any specific operating system or environment. Accordingly, the disclosure of the present embodiment of invention is intended to be illustrative, but not limiting, of the scope of the present embodiment of invention, which is set forth in the following claims.

The invention claimed is:

1. A computer-implemented method of copying a document and its associated metadata, the method comprising:
   receiving a document that includes pages;
   generating, with one or more processors, page metadata for each page of the document and document metadata for the document;
   receiving a modification of a first page in the document;
   updating, with the one or more processors, the page metadata for the first page;
   generating, with the one or more processors, a hash of the modification in the document metadata;
   receiving a first request for a first copy of the document;
   copying the document, the page metadata and the document metadata; and
   transmitting the document, the page metadata and the document metadata based on the first request.

2. The method of claim 1, further comprising the steps of:
   receiving a notification of an erasure of at least one segment of a stroke;
   removing the at least one segment from the page metadata associated with the page where the stroke appears; and
   removing the at least one segment from the document metadata.

3. The method of claim 1, further comprising the steps of:
   receiving a second request for a second copy of selected pages within the document;
   copying the page metadata for the selected pages;
   updating the document metadata with the page metadata from the selected pages; and
   transmitting the page metadata and the document metadata.

4. The method of claim 1, further comprising the steps of:
   receiving a second request for a second copy of redacted pages;
   redacting content from the page metadata;
   updating the document metadata with the page metadata for the redacted content;

copying the document metadata and the page metadata for the redacted content; and transmitting the document metadata and the page metadata for the redacted content.

5. The method of claim 4, further comprising the step of comparing the updated document metadata to a previous version of the document metadata to verify an authenticity of the updated document metadata.

6. The method of claim 1, wherein the document metadata includes at least one of optical character recognition metadata, barcode recognition metadata and video link metadata.

7. The method of claim 1, wherein audio text is saved as the document metadata and portions of the audio text are saved as the page metadata if the portions reference a page.

8. The method of claim 1, wherein the page metadata includes at least one of stroke data, a page log and an image.

9. The method of claim 1, wherein the page metadata and the document metadata are included in a compound document.

10. A system for copying a document and its associated metadata, the system comprising:
one or more processors;
a logging module stored on a memory and executable by the one or more processors, the logging module for receiving a document that includes pages and is generated by an application, generating page metadata for each page of the document and document metadata for the document, receiving a modification for a first page in the document, updating the page metadata for the first page, generating a hash of the modification in the document metadata, receiving a request for a first copy of the document, copying the document, the page metadata and the document metadata and transmitting the document, the page metadata and the document metadata based on the first request.

11. The system of claim 10, wherein the logging module is further configured to:
receive a notification of an erasure of at least one segment of a stroke;
remove the at least one segment from the page metadata associated with the page where the stroke appears; and
remove the at least one segment from the document metadata.

12. The system of claim 10, wherein the logging module is further configured to:
receive a second request for a second copy of selected pages within the document;
copy the page metadata for the selected pages;
update the document metadata with the page metadata from the selected pages; and
transmit the page metadata and the document metadata.

13. The system of claim 10, wherein the logging module is further configured to:
receive a second request for a copy of redacted pages;
redact content from the page metadata;
update the document metadata with the page metadata for the redacted content;
copy the document metadata and the page metadata for the redacted content; and
transmit the document metadata and the page metadata for the redacted content.

14. The system of claim 13, wherein the logging module is further configured to compare the updated document metadata to a previous version of the document metadata to verify an authenticity of the updated document metadata.

15. A computer program product comprising a non-transitory computer usable medium including a computer readable program, wherein the computer readable program when executed on a computer causes the computer to:
receive a document that includes pages;
generate page metadata for each page of the document and document metadata for the document;
receive a modification of a first page in the document;
update the page metadata for the first page;
generate a hash of the modification in the document metadata;
receive a first request for a first copy of the document;
copy the document, the page metadata and the document metadata; and
transmit the document, the page metadata and the document metadata based on the first request.

16. The computer program product of claim 15, wherein the computer readable program when executed on the computer further causes the computer to:
receive a notification of an erasure of at least one segment of a stroke;
remove the at least one segment from the page metadata associated with the page where the stroke appears; and
remove the at least one segment from the document metadata.

17. The computer program product of claim 15, wherein the computer readable program when executed on the computer further causes the computer to:
receive a second request for a second copy of selected pages within the document;
copy the page metadata for the selected pages;
update the document metadata with the page metadata from the selected pages; and
transmit the page metadata and the document metadata.

18. The computer program product of claim 15, wherein the computer readable program when executed on the computer further causes the computer to:
receive a second request for a second copy of redacted pages;
redact content from the page metadata;
update the document metadata with the page metadata for the redacted content;
copy the document metadata and the page metadata for the redacted content; and
transmit the document metadata and the page metadata for the redacted content.

19. The computer program product of claim 18, wherein the computer readable program when executed on the computer further causes the computer to compare the updated document metadata to a previous version of the document metadata to verify an authenticity of the updated document metadata.

20. The computer program product of claim 15, wherein the document metadata includes at least one of optical character recognition metadata, barcode recognition metadata and video link metadata.

* * * * *